US005747786A

United States Patent [19]
Cargin, Jr. et al.

[11] Patent Number: 5,747,786
[45] Date of Patent: May 5, 1998

[54] COMMUNICATION MODULE FOR A DATA CAPTURE SYSTEM

[75] Inventors: Keith K. Cargin, Jr.; Ronald L. Mahany; Dennis A. Durbin; Darrell L. Boatwright, all of Cedar Rapids; Stephen J. Kelly, Marion; Darald R. Schultz; William T. Gibbs, both of Cedar Rapids, all of Iowa

[73] Assignee: Norand Corporation, Cedar Rapids, Iowa

[21] Appl. No.: 460,413

[22] Filed: Jun. 2, 1995

Related U.S. Application Data

[62] Division of Ser. No. 289,322, Aug. 11, 1994, Pat. No. 5,515,303, which is a continuation of Ser. No. 984,980, Nov. 30, 1992, abandoned, which is a continuation-in-part of Ser. No. 921,449, Jul. 28, 1992, abandoned, which is a continuation-in-part of Ser. No. 707,954, May 22, 1991, abandoned, which is a continuation-in-part of Ser. No. 364,594, Jun. 7, 1989, abandoned, and a continuation-in-part of Ser. No. 364,902, Jun. 8, 1989, abandoned, and a continuation-in-part of Ser. No. 339,330, Apr. 14, 1989, abandoned, said Ser. No. 289,322, is a continuation-in-part of Ser. No. 777,393, filed as PCT/US90/03282, Jun. 7, 1990, published as WO90/16033, Dec. 27, 1990, Pat. No. 5,410,141.

[51] Int. Cl.[6] .................................................. G06K 7/10
[52] U.S. Cl. ................................... 235/472; 235/462
[58] Field of Search ................................ 235/462, 472

[56] References Cited

U.S. PATENT DOCUMENTS

| | | | |
|---|---|---|---|
| 3,991,299 | 11/1976 | Chadima, Jr. et al. | 235/472 |
| 4,180,204 | 12/1979 | Koenig et al. | 235/472 |
| 4,409,470 | 10/1983 | Shepard et al. | 235/472 |
| 4,418,277 | 11/1983 | Tremmel et al. | 235/472 |
| 4,443,694 | 4/1984 | Sanford | 235/462 |
| 4,465,926 | 8/1984 | Apitz et al. | 235/472 |
| 4,621,189 | 11/1986 | Kumar et al. | 235/472 |
| 4,706,096 | 11/1987 | Sato | 235/487 |
| 4,718,110 | 1/1988 | Schaefer | 455/90 |
| 4,727,245 | 2/1988 | Dobbins et al. | 235/472 |
| 4,835,372 | 5/1989 | Gombrich et al. | 235/462 |
| 4,850,009 | 7/1989 | Zook et al. | 235/375 |
| 4,916,441 | 4/1990 | Gombrich | 235/462 |
| 4,935,745 | 6/1990 | Mori et al. | 343/702 |
| 4,983,818 | 1/1991 | Knowles | 235/472 |
| 5,043,721 | 8/1991 | May | 340/825.44 |
| 5,047,615 | 9/1991 | Fukumoto et al. | 235/472 |
| 5,059,951 | 10/1991 | Kaltner | 235/487 |

Primary Examiner—Donald T. Hajec
Assistant Examiner—Mark Tremblay
Attorney, Agent, or Firm—Stanford & Bennett, L.L.P.

[57] ABSTRACT

A communication module for use with a portable terminal. The module includes a housing, mounting apparatus, a radio frequency transceiver and an indicia reader connector. The module can enable real-time, on-line communication with a remote host. The system can also include an antenna.

8 Claims, 15 Drawing Sheets

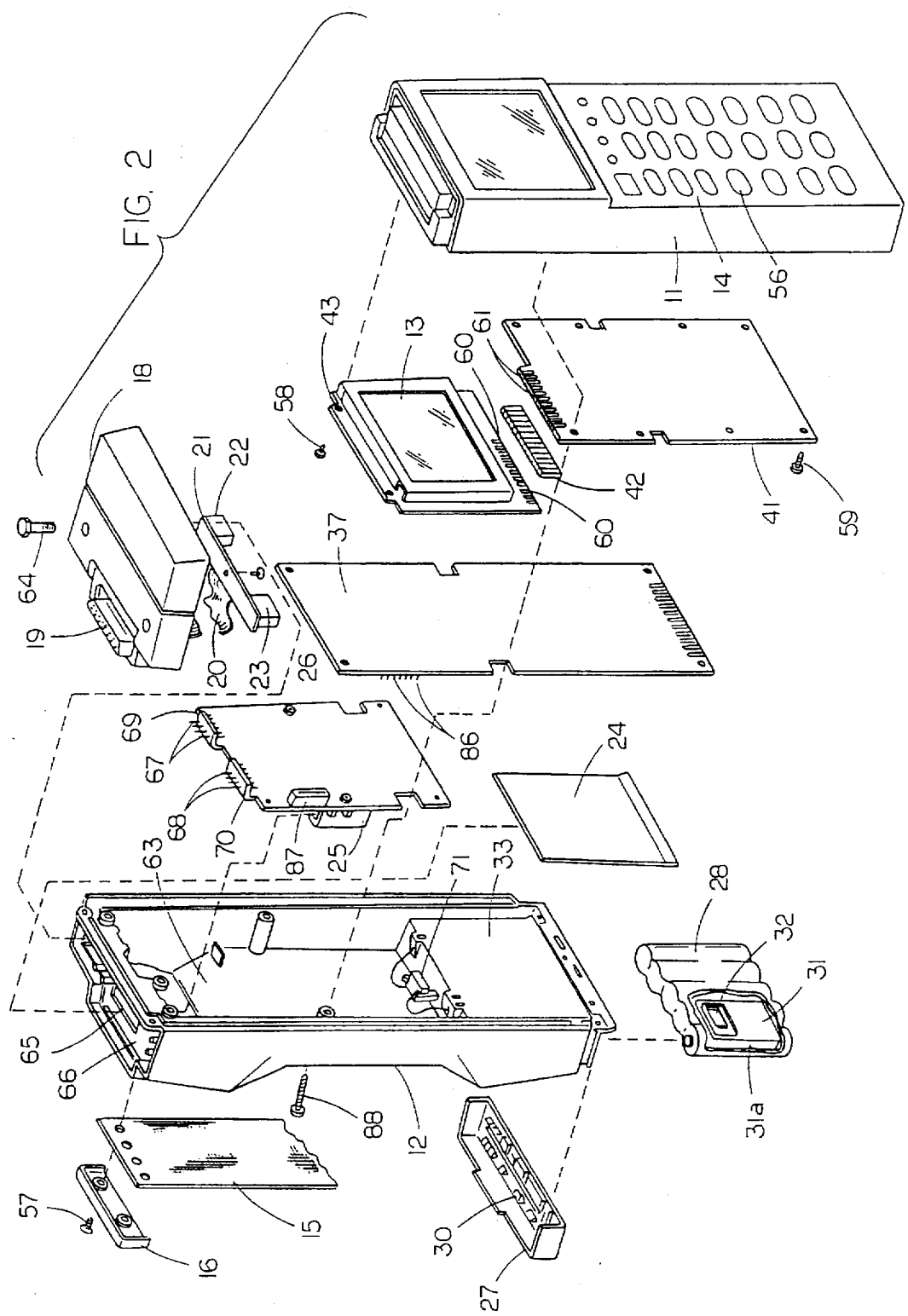

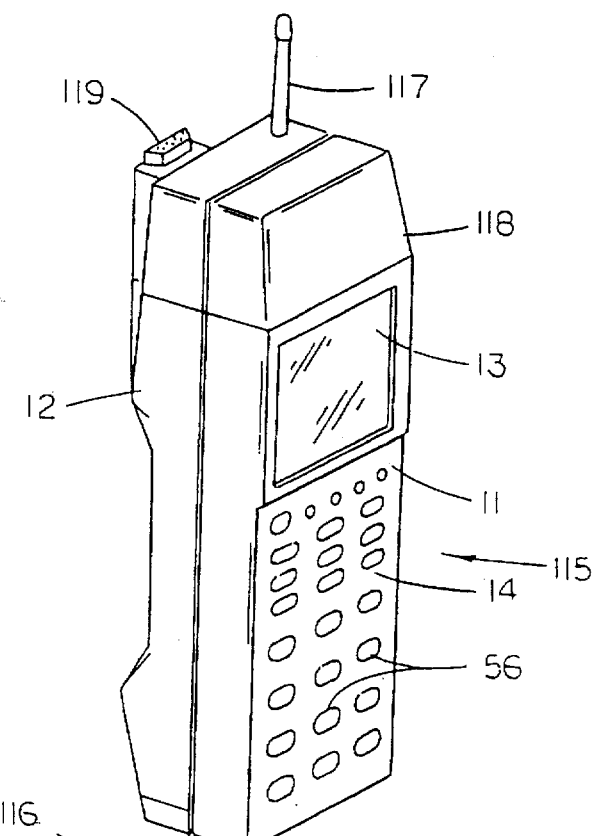
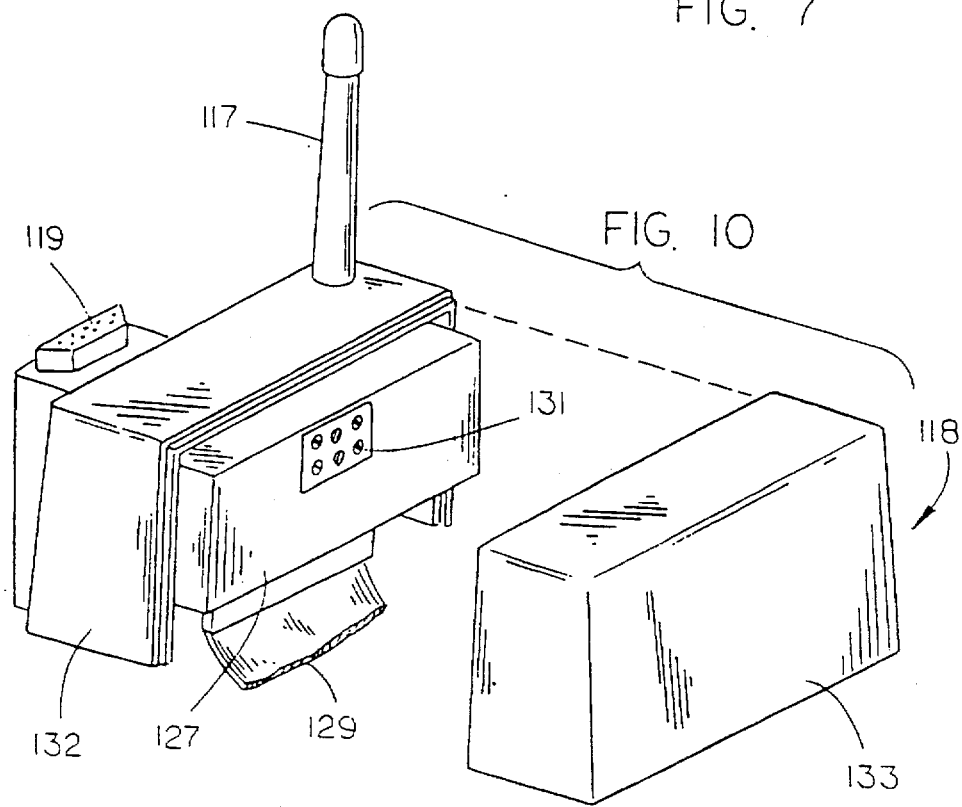

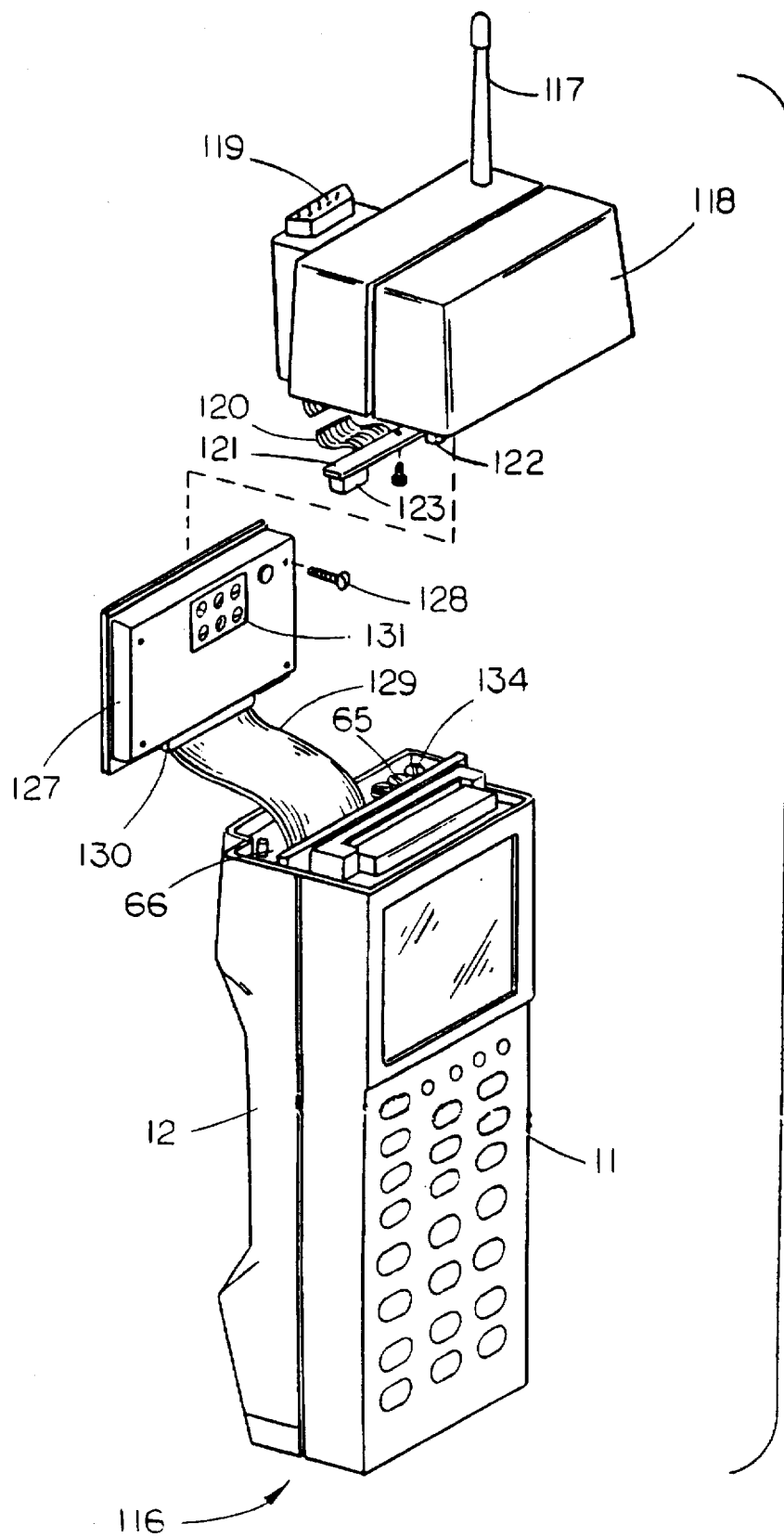

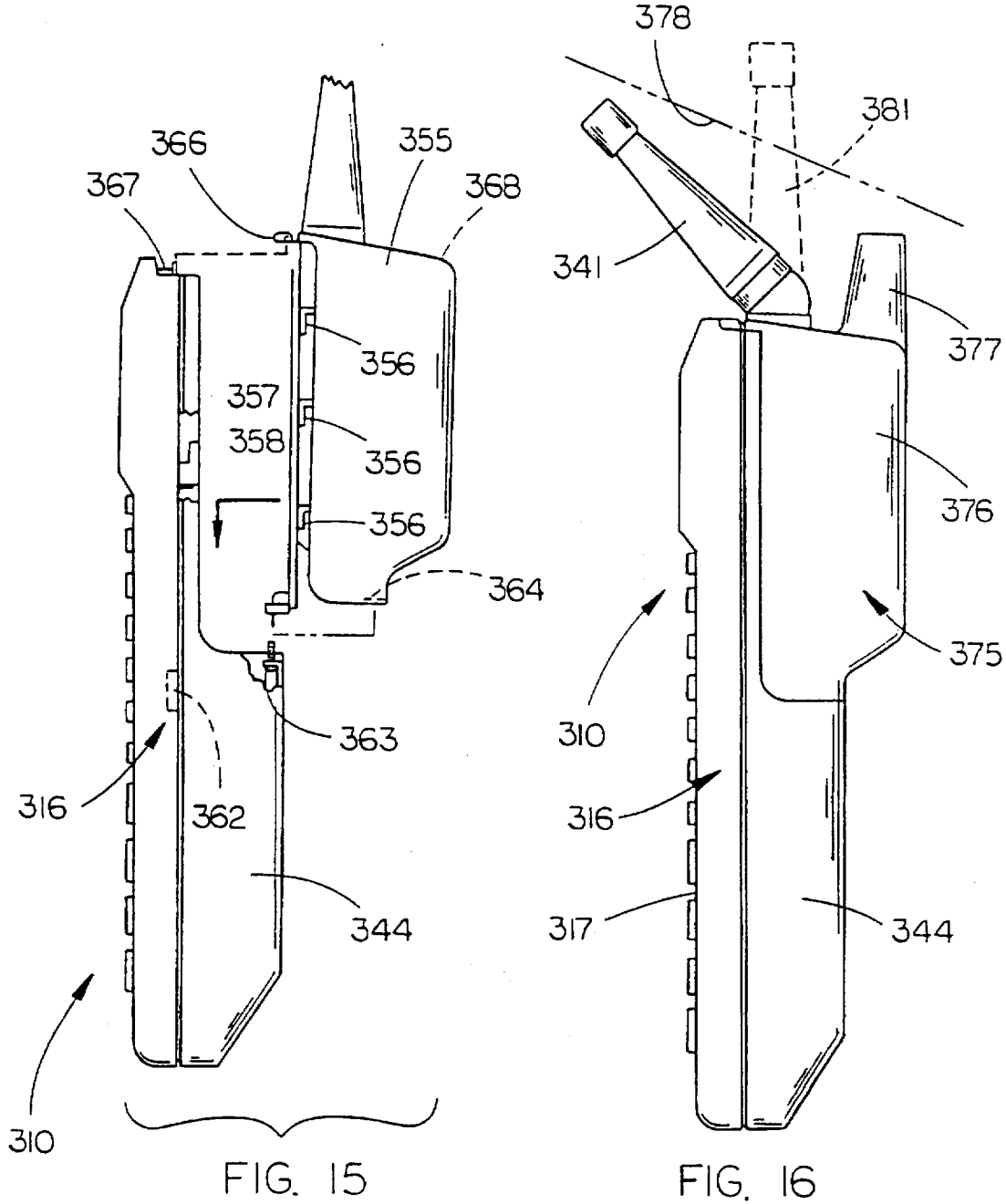

COMMUNICATION MODULE FOR A DATA CAPTURE SYSTEM

CROSS REFERENCE TO RELATED APPLICATIONS

The present application is a divisional of application Ser. No. 08/289,322, filed Aug. 11, 1994 (now U.S. Pat. No. 5,515,303, issued May 7, 1996); which is a continuation of application Ser. No. 07/984,980, filed Nov. 30, 1992 (now abandoned); which is a continuation-in-part of application Ser. No. 07/921,449, filed Jul. 28, 1992 (now abandoned); which is a continuation-in-part of application Ser. No. 07/707,954 filed May 22, 1991 (now abandoned); which is a continuation-in-part of application Ser. No. 07/364,594, filed Jun. 7, 1989 (now abandoned), and of application Ser. No. 07/364,902, filed Jun. 8, 1989 (now abandoned); the said application Ser. No. 07/364,594 being a continuation-in-part of application Ser. No. 07/339,330, filed Apr. 14, 1989 (now abandoned).

Said application Ser. No. 08/289,322 is also a continuation-in-part of application Ser. No. 07/777,393, with a filing date of Dec. 6, 1991, and an effective date of Jan. 7, 1992 (now U.S. Pat. No. 5,410,141, issued Apr. 25, 1995), which is the national phase of International application Ser. No. PCT/US90/03282, having an international filing date of Jun. 7, 1990, an international publication date of Dec. 27, 1990, and an International Publication No. WO90/16033; which is a continuation-in-part of the above-referenced application Ser. Nos. 07/364,594 and 07/364,902.

Each of the above U.S. and international applications is hereby incorporated herein by reference in its entirety.

INCORPORATION BY REFERENCE

Applicant also hereby incorporated by reference U.S. Ser. No. 07/547,087 filed Jun. 29, 1990, U.S. Pat. No. 4,953,113 issued Aug. 28, 1990 (based on application U.S. Ser. No. 07/406,822 filed Sep. 7, 1989 of which application Ser. No. 07/547,087 is a continuation-in-part), and U.S. Pat. No. 5,023,824 issued Jun. 11, 1991 (based on application Ser. No. 07/478,591 filed Feb. 9, 1990, of which application Ser. No. 07/547,087 is a continuation-in-part).

In the route delivery industry, where a truck driver makes numerous deliveries to individual customers and locations, It is necessary for the driver to make a record of the delivery and to provide a delivery ticket or invoice to the customer along with the goods delivered. The traditional method of accomplishing this task is through the handwritten creation of an invoice or delivery ticket which is then torn from the invoice book or ticket book, as the case may be, and is then provided to the customer.

In recent years, improvements in the traditional method have been developed wherein an electronic device is mounted within the truck driver's vehicle which will provide invoices or delivery tickets by printing means. In such cases, a calculating machine is provided with a keyboard and printing mechanism so that the driver may enter the customer information, the quantity delivered, pricing and other information, and thereby to create in printed form an invoice to present to the customer, while also creating a permanent copy for retention by the driver for submission to the accounting department at the home office at the end of the route.

Later developments in the route delivery industry have led to devices which are handheld which may be carried with the driver into the customer's facility so that order entry information or other data may be entered by the driver while examining the customer's preexisting inventory, or while discussing the customer's needs with the customer's representatives.

Existing devices of this sort provide a small display, usually of two or four lines of sixteen characters each, with a limited electronic memory. Existing devices are frequently equipped with nickel-cadmium or other rechargeable batteries for power, though some devices operate with non-rechargeable batteries.

Since alkaline or other non-rechargeable batteries are likely to vent gaseous or liquid substances when recharging attempts are made upon such batteries, some feature must be provided on the device to prevent such misuse, while allowing the recharging of proper rechargeable batteries. With some existing devices which have recharging circuitry contained in them, cautionary language is provided on the case of the unit or in the operating instructions.

In other units, no recharging circuitry is provided and therefore the rechargeable batteries must be removed from the hand-held unit and recharged exteriorly of the unit. After recharging is completed, the user must re-install the batteries, taking care to install them in the proper orientation.

In other devices containing recharging circuitry, an external user operated switch of the slide or toggle variety Is provided on the exterior of the unit's case such that the user can change the switch to disable the recharge circuitry when non-rechargeable batteries are in the unit, or to enable the recharging circuitry when rechargeable batteries are installed in the unit. This requires the user to remember to set the switch correctly when batteries are placed in the unit.

In order to effectuate recharging of internally mounted rechargeable batteries in existing units, the internal recharging circuitry of the hand-held unit must be provided with externally mounted connectors to engage a source of recharging power. Existing units are provided with connectors of the pin and socket variety, commonly the well-known D-sub variety where a generally D-shaped shell houses a plurality of pins and sockets which mate with complementing elements of external devices intended to be interconnected thereto. Due to the pin and socket architecture, care must be taken that interconnection is accomplished accurately and that damage to the pin and socket elements does not occur when interconnection is made or when the connector is not connected. Because hand-held units are repeatedly handled in varying environments, it is common for damage to, or contamination of, the pins or sockets to occur. Repair and maintenance of the connectors is necessarily undertaken at a repair facility in that event.

The internal circuitry of known devices is provided with a central processing integrated circuit element, having random access dynamic memory associated therewith, with interface circuitry to the keyboard and display and with circuitry to enable communication of the gathered data within the unit with external computing devices. The communication circuitry used in known devices allows communication with a single external unit through a standard protocol promulgated by the Electronic Industries Association (E.I.A.) known as RS-232C. No provision is made in existing hand-held route delivery data entry terminal devices for the addition of auxiliary memory devices or for intercommunication with devices other than those which communicate on the RS-232C protocol.

The construction of existing hand-held data entry devices used in the route delivery industry typically comprises a circuit board assembly contained within a housing. The interconnection of the processing circuitry with the display circuitry is through permanent, soldered connections. Likewise the interconnections of the central processing unit integrated circuit to data collecting random access memory, to peripheral device interface circuitry, to memory management circuitry, and to communications interface circuitry is all by permanently soldering in existing devices.

In prior art devices, machine instructions have been carried in non-dynamic memory, that is, in read only memory devices, better known as erasable programmable read only memory or EPROMS which are programmed during manufacture and are permanently installed in the existing device to control the operation of the central processing unit integrated circuit. A change in machine instructions is only accomplished by extensive retrofit of components.

Existing terminals employ processor integrated circuits which are able to process data in eight bit partitions, which, due to the nature of such eight bit architecture of the processor integrated circuit, limits the direct access of the central processing unit to 64,000 bytes of data.

In existing prior art units, electrostatic discharge protection is afforded by use of conductive metallic enclosures or by use of metallic sheathing applied to the inner walls of the enclosure of the devices, such sheathing or metallic enclosures being electrically connected to ground terminals of external devices when interconnection of hand-held data entry terminals is effectuated. Such methods of electrostatic discharge protection are susceptible to transient signals coming into the devices over interconnection circuitry from exterior units, though affording reasonable protection from transient signals created by electrostatic discharge arising on the exterior of the unit.

SUMMARY OF THE INVENTION

The present invention pertains to hand-held computer apparatus and in particular to hand-held data entry terminals used by route delivery drivers to enter data and to prepare printed data.

A hand-held data entry terminal is provided which comprises an elongated housing formed to be comfortably held in the hand of a user while data is entered by such user on the keypad thereof with the user's opposite hand. The front wall of the enclosure provides a display which may be either of an eight line or sixteen line dimension and features a keypad having a plurality of numeric, alphabetic and function keys. A flexible strap is removably mounted to the rear wall of the unit providing a flexible strap member with which the user may retain his or her hand against the rear wall of the enclosure. The strap member is removably fixed to the rear of the enclosure by clamping elements retaining the end of the strap member to the rear wall of the device. The clamping members may be conveniently adjusted by the user to release the ends of the strap member through use of simple hand tools. The strap member may therefore be exchanged with a replacement when wear necessitates repair.

A first end wall of the enclosure is provided with a removable hatch element overlying a battery receiving chamber wherein a plurality of non-rechargeable batteries may be inserted by the user. Alternatively, a battery pack member comprising a plurality of ganged together rechargeable batteries may be Inserted in the battery receiving chamber to provide main power to the device. Paired probe elements are disposed upon an inner wall of the battery receiving chamber which engage a conductive element on the ganged together rechargeable battery unit whereupon said probes are electrically interconnected. An elongate bar is disposed at a selected end of the battery pack member to provide a key to prevent improper insertion of the battery pack member within the battery receiving chamber and insuring that the conductive element on the battery pack member engages the probe elements of the battery receiving chamber.

A battery recharging circuit is provided within the enclosure which senses the interconnection of the probe elements to discriminate between rechargeable batteries and non-rechargeable batteries within the battery receiving chamber. When rechargeable batteries are present in their ganged together unit arrangement, said recharging circuitry is enabled to pass recharging power to the batteries. When non-rechargeable batteries are present in the battery receiving chamber, the probe elements are not engaged or electrically interconnected. This open circuit condition is sensed and the recharging circuitry is disabled from providing recharging power to the batteries within the battery receiving chamber.

A second end of the invention is provided with a removable end cap having thereon a connector for electrical interconnection with mating devices. Said end cap encloses a cavity within said second end wherein a slot is provided to provide access to an internal electrical connector. Optional memory device carrying subassemblies having a generally planar configuration and contact means on a side thereof may be disposed within said slot to engage the electrical conductor disposed therein. Such optional memory subassemblies are allowed to function as discrete memory units, having capacity to store or be read repeatedly.

Disposed upon a wall of said cavity of said second end are a plurality of upstanding pin conductors. Within said end cap are provided complementary sockets disposed upon said cap to engage said upstanding pins of said cavity when said end cap is installed upon said second end of said housing. The sockets of the end cap are electrically connected to corresponding conductor elements of a D-sub type connector mounted to the exterior of the end cap.

Further provided within said cavity is an elongate opening disposed to provide a passageway for an electrically insulative strip to be selectively passed therethrough. Said insulative strip is a generally flexible elongate planar body initially disposed at one end thereof between a miniature battery and a battery contact and having a free end extending through said elongate opening. Said battery is of the miniature disk-like, lithium type and is provided as back up power to the central processor circuitry. When the invention device is ready to be placed in service, the end cap is removed and the insulative strip is removed from the device, thereby providing battery power to the circuitry to which it relates within the unit.

Within the housing of the invention are provided plural circuit boards, including a display carrying assembly with associated control circuitry therewith. Interconnection between said display carrying assembly and a main elongate, generally planar, circuit board is made by means of the contact engagement of terminal elements by an intermediary resilient conductor element having a plurality of generally parallel miniature conductors therein disposed to engage complementing terminal elements of the circuit board to be interconnected.

The preferred embodiment of the invention is provided with integrated electrostatic discharge protection associated with the incoming signal paths of the device. Because of this novel advance, the housing of the data entry terminal may be constructed of lighter materials and molded from polymeric materials into an aesthetically pleasing and comfortably held form. The expensive application of metallic sheathing is avoided while isolation of sensitive circuit components from electrostatic discharge transients is achieved.

Interengagement of component assemblies of the housing-contained circuitries is achieved by pin and socket mating conductors, thereby allowing retrofit of existing units without difficult disassembly as is usual with existing units. The modular architecture of the invention device allows for exchange of peripheral interface boards, thereby affording added versatility of use to the device and for ease of manufacture of varying models of the invention.

The preferred embodiment of the invention is provided with communication interface circuitry which complies with RS-485 protocol as defined by the Electronic Industries Association, thereby providing interchange of data between the data entry terminal and peripheral or host devices at a maximum of 500,000 bits per second. Interface circuitry for communication of serially supplied data at rates up to 19,200 bits per second according to the predominant RS-232C protocol is also provided to afford communication compatibility with existing devices.

A liquid crystal diode display having sixteen lines of twenty characters each is provided on the display circuitry assembly which is electrically interconnected to the main circuit board as above summarized. The housing may alternatively receive a display having four lines of sixteen characters each if desired.

In accordance with an important aspect of the present disclosure, a light weight low cost basic terminal can be adapted for on-line RF communication with a host computer and selectively accommodate high throughput bar code scanners of the instant type such as CCD bar code scanners and deflected laser beam scanners, while essentially avoiding the deficiencies in the prior art devices.

It is highly desirable that the data capture system be compatible with existing peripheral equipment, e.g., for downloading data to the terminal and where applicable recharging the terminal batteries. In a particularly advantageous embodiment a basic terminal unit has one end with external contacts compatible with existing communicating and recharging docking apparatus and an opposite end adapted to selectively receive various modular adaptor end caps. Besides a compatibility end cap providing standard overall dimensions and a standard electrical connector arrangement compatible with an existing printer docking receptacle, the terminal may be coupled with an automatic bar code scanner or other desired peripheral device. The basic terminal may receive an RF module adapting the terminal for on-line RF communications.

In accordance with preferred features, the RF module can be removed and replaced with another similar module without requiring any tuning adjustments. Further such module interchange can most preferably be carried out in the field by the end user. Because of such capability the useful life of the basic terminal may be extended without service interruptions for return to the factory or service center, and the terminal is readily upgraded and adapted to new operating requirements. For example, different operating frequencies can be selected simply by replacing the RF module. This is achieved by stocking only the desired modules which are of low cost in comparison to the total system. Similarly, the laser scanning component may be associated with the basic terminal only as needed, the basic terminal alone being used where only this type of capability is required.

An object of the invention is to provide a basic terminal configuration of compact light weight construction but which is readily adapted to wireless data communication with other components of a data capture system such as a host computer, and which preferably retains a capability for coupling with a non-contact self scanning type bar code reader or other highly efficient data capture component.

Another object is to provide such a basic terminal configuration which can be quickly and easily associated with a wireless transceiver module without requiring special tools.

A further object of the invention resides in the provision of a basic terminal configuration with modular means for providing RF communications capability or the like. Preferably the RF module can be replaced in the field without requiring any tuning adjustment.

Still another object of the invention relates to the provision of a hand-held type data capture system wherein a basic low cost light weight terminal unit can selectively receive various modules such as an RF module, but such system retaining the option of compatibility with existing communicating and/or recharging docking receptacles (e.g., of a portable printer or the like).

In an illustrated embodiment, an RF adapter module is electrically coupled with a control microprocessor of the basic terminal configuration. The control microprocessor may be installed on the peripheral card within the terminal, and the peripheral card in turn may have pin and socket type coupling with a host printed circuit board mounting a main computer processor. The RF adapter module may have a standard external connector fitting and may contain electrical connector means therefor which automatically engage with mating electrical connector means on the peripheral card as the end cap module is mechanically applied to the terminal. Radio frequency and/or scanner cabling from the peripheral card may pass through a slot in the end wall of the terminal and may be manually connected with the receive/transmit circuits and/or external scanner connector of the RF module prior to fastening of the module to the terminal, or automatic coupling means may be provided for the RF and/or scanner circuits as well as for the standard external connector fitting.

The mating parts of the terminal are modular in the sense that they can be readily disconnected from each other. One interface part can be disconnected, removed as a unit, and replaced with a part of the same or different width. Similarly, the basic part or wireless part is readily disconnected from the other parts, removed as a unit, and replaced. Further in preferred form each modular part has only quick disconnect type signal coupling with the other parts, and most preferably the parts are self-guided so that the couplings are achieved as the automatic result of correct interfitting of the parts, as the parts are pressed together. In the ideal embodiment, each module has definable performance characteristics which permit it to be tested and adjusted as a separate unit. Then the various parts can be interchanged without requiring any further tuning or adjustment.

The invention is provided with a plurality of electrically conductive pads generally coplanar with the external surface of the housing and fixed thereto. Such electrically conductive pads are interconnected by internal circuitry to the connector elements of the D-style connector mounted upon the housing end cap such that recharge power and data communication pathways may be made through either or both of said contact means. The electrically conductive pads are positioned such that they may be engaged with mating elements having sufficient resilience to make definitive electrical contact therebetween when placed in engagement.

An alternative embodiment of the invention is disclosed which provides a hand-held computer terminal which may communicate by radio transmission with a remote host computer. A removable end cap is detachably mounted to an end of the terminal member of the device. Housed within the end cap is a radio module comprising transmission and receiving means which are coupled by wiring to a peripheral controller card mounted within the terminal member of the invention. Cabling interconnecting the radio module of the end cap passes through an opening or slot within the end wall of the terminal device.

The end cap is provided with an antenna depending from it for transmission and receiving of the outgoing and incoming signals. An external connector mounted to the end cap allows attachment of optional peripheral devices to the invention.

Base band processing components are contained within the peripheral controller card within the terminal member. These components of the peripheral controller card are coupled to the main central processing unit of the terminal member by connector means.

The end cap may be separated into parts, thereby providing easy access to adjusting elements which may be employed to adjust signal levels or frequencies, while allowing the radio module to continue to be electrically coupled to the peripheral controller card of the terminal member. While the end cap is removed, access to adjusting elements on the peripheral controller card may be had.

The peripheral controller card is mounted to other system circuitry boards within the terminal member by detachable connector means, thereby allowing easy assembly of differing end units from common parts in similar assembly processes.

One object of the invention is to provide an improved and easily manufactured hand-held data entry terminal unit for use in the route delivery industry.

Another object of the invention is to provide a hand-held data entry terminal device having an engaging support strap mounted thereto which is easily removed by the user of the device.

Another object of the invention is to provide a hand-held data entry terminal device having sensory means therein to automatically detect the presence of rechargeable batteries and to thereupon enable recharging circuitry for said rechargeable batteries.

Another object of the invention is to provide a hand-held data entry terminal device having an easily replaceable rechargeable battery pack formed to effectuate easy and proper orientation within the device, Another object of the Invention is to provide a hand-held data entry terminal device having a removable cavity enclosing end cap to facilitate exchange of modular, plugable, peripheral accessory devices.

Another object of the invention is to provide a hand-held data entry terminal device having a battery isolating feature for use while in shipment which is easily removable by the user upon placement in service.

Another object of the invention is to provide a hand-held data entry terminal device having a modular internal structure wherein control circuitry carrying circuit board subassemblies may be exchanged for replacement or upgraded subassemblies by plug engagement means.

Another object of the invention is to provide a hand-held data entry terminal device having an easily exchangeable display subassembly.

Another object of the invention is to provide a hand-held data entry terminal device having improved electrostatic discharge avoidance characteristics, Another object of the invention is to provide a hand-held data entry terminal device having an external telecommunications capability of up to 500,000 bits per second.

Another object of the invention is to provide a hand-held data entry terminal device having an information display showing sixteen lines of twenty characters each.

Another object of the invention is to provide an improved hand-held data entry terminal device which may communicate by two-way radio transmission with a host computer.

Another object of the invention is to provide a hand held data entry terminal of a modular design which will communicate by radio transmission.

Another object of the invention is to provide a hand-held data entry terminal adapted to removably receive and utilize PCMCIA Type I feature cards.

These and other objects will be best understood from examination of the detailed description of the invention and its preferred embodiments as set forth below.

BRIEF DESCRIPTION OF THE DRAWINGS

FIG. 2 is an exploded view of the hand-held computer terminal illustrated in FIG. 1;

FIG. 7 is a perspective view of an alternative embodiment of the invention;

FIG. 8 is an exploded perspective view of the alternative embodiment of FIG. 7;

FIG. 10 is an exploded perspective view of the end cap of the alternative embodiment of FIG. 7;

FIG. 15 is a side view of an alternate data terminal in accordance with the invention, a particular provision in accordance with certain features of the invention for engaging and disengaging a data and communications module with respect to a base module being illustrated;

FIG. 16 is a side view of an alternate data terminal in accordance with the invention showing particular features relating to a data and communications module in combination with a base module, such features relating to the data and communications module having an RF communications provision and a data scanning provision and including further a pivotal antenna, all in accordance with the invention;

DETAILED DESCRIPTION

Figure 1:
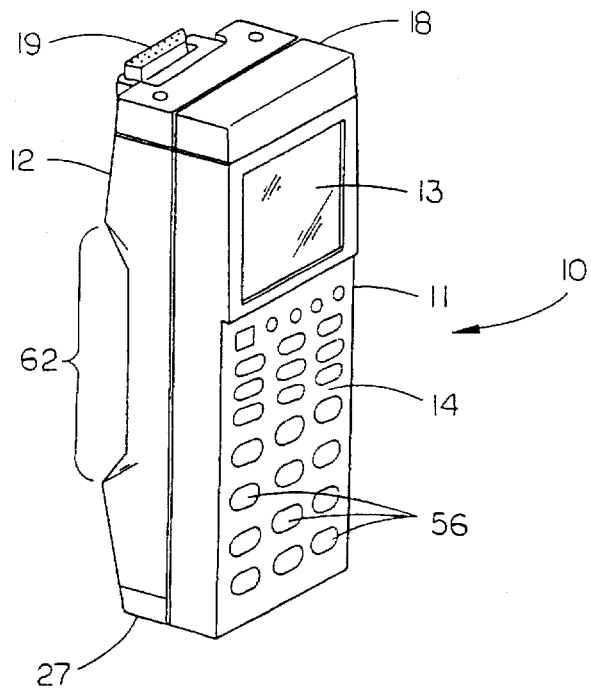
FIG. 1 is a somewhat diagrammatic frontal perspective view showing a hand-held computer terminal embodying the technologies and teachings of the present invention.
Figure 5:
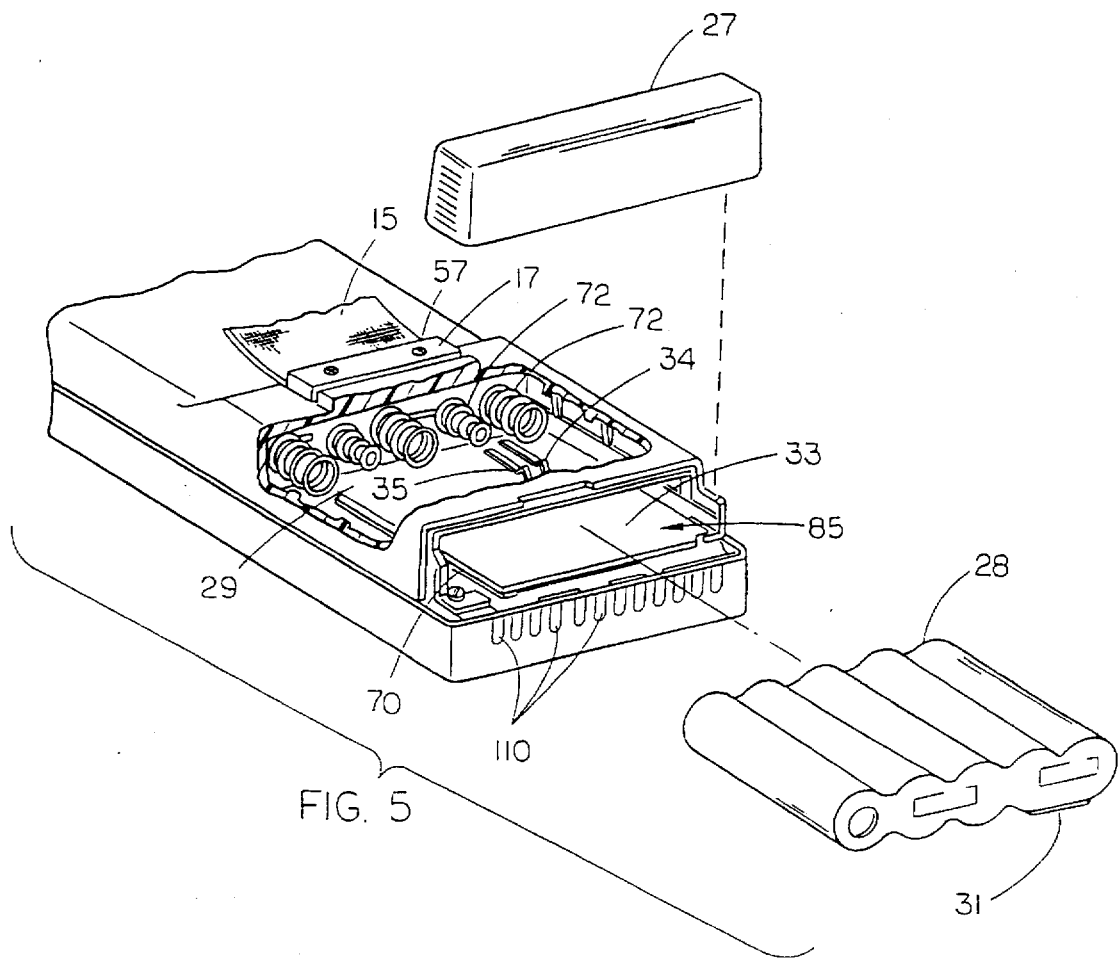
FIG. 5 is a diagrammatic bottom end-backside view of the computer terminal with a cut-away view of a battery compartment, showing a detached battery end cap and a removed nickel-cadmium battery pack.

FIG. 1 shows a portable hand-held computer terminal 10 embodying the technologies of the present invention. The components of computer terminal 10 are housed in a two-piece elongated housing 11 and 12, the back housing 12 of which is formed in a manner as to enable a user to hold the device comfortably, in one hand, for extended periods of time. In the preferred embodiment of the invention, terminal 10 may be powered by a rechargeable nickel-cadmium battery pack 28 or a plurality of AA size batteries as seen in FIG. 5, enclosed. Referring to FIG. 2, within the terminal housing 11 and 12 are four permanently mounted printed circuit boards 26, 37, 41, and 43, namely a host printed circuit board 37, a display printed circuit board 43, a keypad printed circuit board 41, and a memory card controller printed circuit board 26. Interconnections between each circuit board are accomplished through a plurality of pins 86 and receptacle 87 type connectors, with the exception of the interconnection between display board 43 and keypad board 41 which is accomplished through a resilient conductive pad 42 and is discussed elsewhere in this document. When assembled, front housing 11 and back housing 12 are joined together by a plurality of screws 88.

The front housing 11 of the terminal 10 provides a mounting platform for a display 13 (FIG. 2) which may provide a visual indication of various types of information. In the preferred embodiment of the invention, display 13 is of a liquid crystal diode (LCD) variety providing sixteen lines, with twenty characters per line, of display area. Optionally, the display 13 may be of a four line type. The display 13 may be mounted upon a display printed circuit board 43 which is then mounted or secured to front housing 11 by a plurality of screws 58. In addition, the front housing 11 may provide a mounting platform for a keypad 14 (FIG. 1), having a plurality of keys 56 thereon. In the preferred embodiment of the invention, keypad 14 is provided with either twenty-three or forty keys. The control and interface circuitry for keypad 14 may be contained on keypad printed circuit board 41 (FIG. 2) which is mounted or secured to front housing 11 by a plurality of screws 59.

Electrical interconnections between the display printed circuit board 43 and keypad printed circuit board 41 may be accomplished through a resilient, conductive pad 42, which may be located between overlapping portions of the aforementioned circuit boards and retained or otherwise held in this location by means of the pressure exerted upon it when the respective circuit cards are mounted in the terminal 10. Conductive pad 42 may contain a plurality of generally parallel, spaced apart conductive elements embedded within it. The overlapping portions of display printed circuit board 43 and keypad printed circuit board 41 each contain a plurality of coplanar, generally parallel, and evenly spaced apart connector elements 60 and 61, respectively. The conductive elements of conductive pad 42, when conductive pad 42 is mounted between the overlapping portions of keypad printed circuit board 41 and display printed circuit board 43, and in positive contact with each of the connector elements 60 and 61, provide a path for the transfer of electrical signals therebetween.

Alternatively, the required electrical interconnections between display printed circuit board 43 and keypad printed circuit board 41 may be accomplished through a flexible multi-conductor ribbon type cable.

The bottom housing 12 of the computer terminal 10 may provide a mounting platform for a removable, elastic type flexible strap 15 (FIG. 2). Flexible strap 15 may allow the user of the computer terminal 10 to relax the user's grip on the terminal 10 for short periods of time, without actually removing the terminal 10 from their person. The flexible strap 15 may be secured to the bottom housing 12 by means of two retaining clamps 16 (FIG. 2) and 17 (FIG. 5). Retaining clamps 16 and 17 are secured to bottom housing 12 through the use of screw 57, with two screws 57 securing a retaining clamp 16 or 17. In the preferred embodiment of the invention, retaining clamps 16 and 17 may be removed with simple hand tools, allowing the flexible strap 15 to be easily replaced. Beneath the flexible strap 15 and generally between retaining clamps 16 and 17, bottom housing 12 is contoured in such a way that, when the terminal 10 is being held by the user, the user's hand is placed on a recessed area 62 (FIG. 1) in bottom housing 12 and beneath flexible strap 15.

Figure 19:
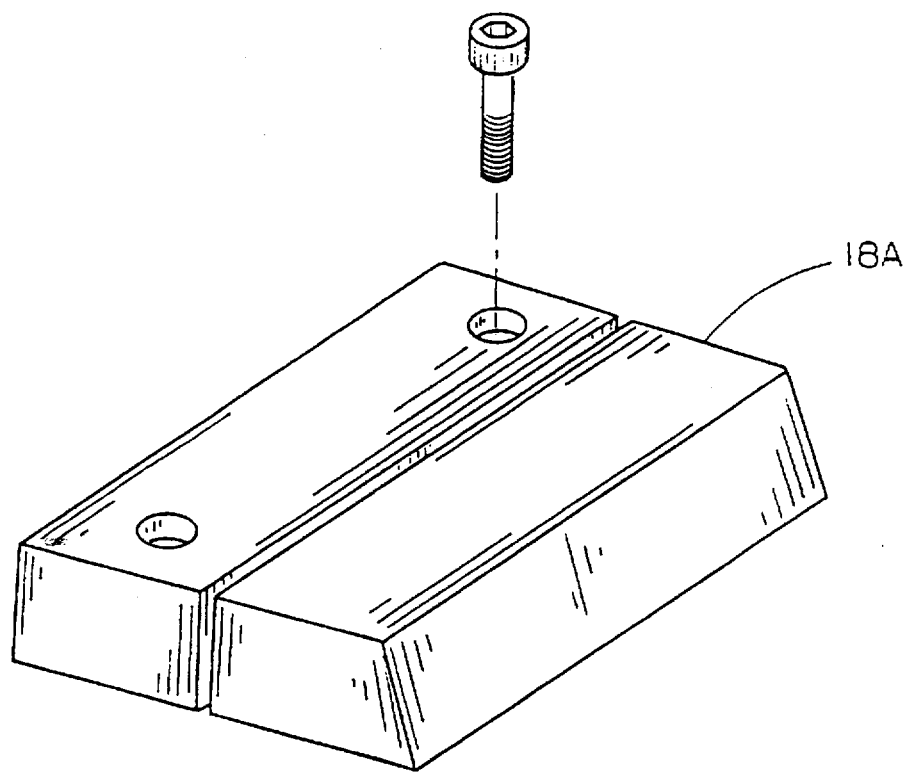
FIG. 19 is a perspective view of an end cap adapted to seal the top end of the terminal of FIG. 1.

Referring to FIG. 2, the top end of the computer terminal 10 may be enclosed with a removable end cap 18. End cap 18 is attached with two screws 64 to computer terminal 10. When installed on terminal 10, end cap 18 overlies and encloses cavity 63, which is formed in terminal 10 during assembly. Located on and part of the end cap 18 may be a multiple pin D-sub type connector 19, which may in turn be direct or hard wired via a flexible multi-conductor ribbon type cable 20 to a connector platform 21, on which may be mounted to two connector receptacles 22 and 23. Cable 20, connector platform 21 and connector receptacles 22 and 23 may also be mounted on, and be a part of, end cap 18. The multiple pin D-sub connector 19 may provide a communications port capable of the two-way transfer of data with other compatible devices, at not more than 19,200 bits of data per second, according to the predominant RS-232 C protocol as defined by the Electronic Industries Association. When end cap 18 is installed on computer terminal 10, receptacles 22 and 23 mate with a plurality of pins 67 and 68 which protrude through connector blocks 69 and 70. Pins 67 and 68, and connector blocks 69 and 70 are each attached or connected to memory card controller card 26. In the preferred embodiment of the invention, said end cap 18 maybe removable using common hand tools. Alternatively, a type of end cap 18A, which does not contain a D-sub connector 19, or any of its associated components, may be used in place of end cap 18 (FIG. 19).

Figure 4:
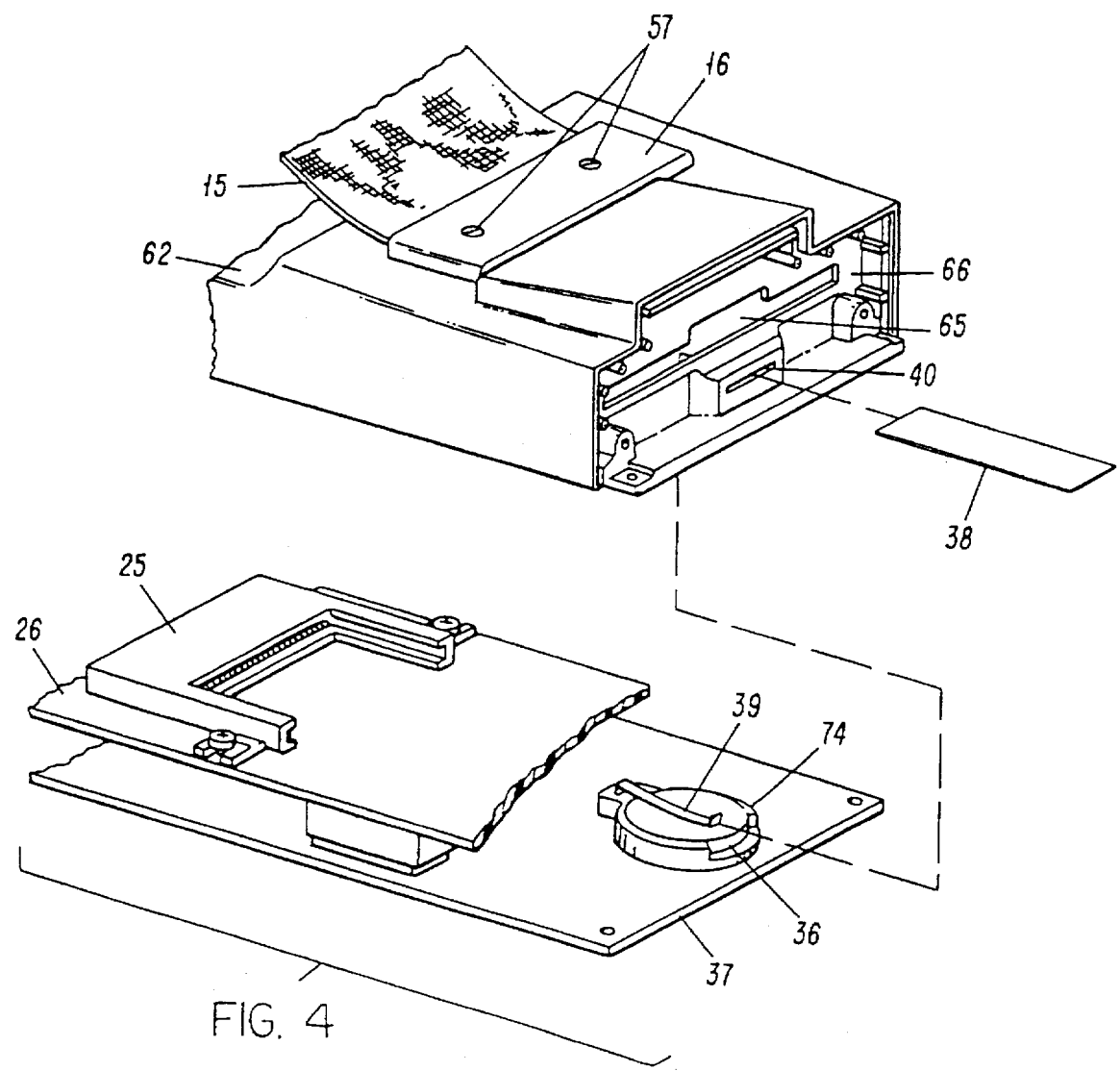
FIG. 4 is a somewhat diagrammatic exploded view of the top end of the invention showing a peripheral memory card mounting/terminal block and a back-up lithium battery with an associated mylar insulating strip.

Memory card 24 may currently be used to increase the embedded memory of the computer terminal 10 by up to five hundred-twelve kilobytes of data, and/or may also contain various application programs which may be run on said computer terminal 10. In the preferred embodiment of the invention, memory card 24 may contain up to four megabytes of available memory or programming and still be compatible with computer terminal 10. Memory card 24 may be easily installed in or removed from computer terminal 10 by removal of end cap 18. With end cap 18 removed, memory card 24 may be inserted in or removed from a type of mounting/electrical contact block 25 (FIG. 4). Said mounting/electrical contact block 25 may be mounted on and electrically connected to a peripheral type memory card controller card 26 (FIG. 2). When memory card 24 is installed in mounting/electrical contact block 25, it occupies the area of cavity 63 and extends through an opening 65 in wall 66. Wall 66 is formed when top housing 11 and bottom housing 12 are joined together.

Memory card controller card 26 may contain the electronic components and circuitry necessary to control the operation of memory card 24, as well as to interface the operation of memory card 24 with that of the computer terminal 10. In addition, memory card controller card 26 provides the electronic circuitry required to interface the two-way data transfer which may occur through D-sub connector 19, described earlier in this document. In the preferred embodiment of the invention, memory card controller card 26 may be a peripheral type device which may be exchanged or otherwise configured with other controller type cards to enable the use of various types of end cap devices. These various end cap devices may enable computer terminal 10 to perform a wide variety of functions not currently possible with existing hand held computer devices including, but in no way limited to, the two-way transfer of data through space using radio frequency waves as the data carrying medium, the two-way transfer of data over telephonic communication links, and the two-way transfer of data with a bar code scanning and reading device, to name just a few.

Likewise, card 24, block 25, cavity 63,, and opening 65, may have dimensions corresponding to PCMCIA Type I cards and may provide voice, data, and facsimile communications. For example, the terminal may be 10 configured to utilize Sierra Semiconductor Corporation's ST4743XCTT VoDaFax modem chip set on a PCMCIA Type I card. Additionally, a PCMCIA slot receiving an RF modular card via a digital coupling may be utilized as described in Ser. No. 07/364,902 filed Jun. 8, 1989 (Attorney Docket No. 36767 now abandoned).

Referring again to FIG. 2, the bottom end of the computer terminal 10 may be enclosed by a type of battery compartment hatch 27. This battery compartment hatch 27 may enclose and retain a rechargeable nickel-cadmium type battery pack 28 in a battery compartment or cavity 29 (FIG. 5), located on computer terminal 10. Optionally, a plurality of AA size batteries which provide the required power may be used in place of nickel cadmium battery pack 28. In the preferred embodiment of the invention, the battery compartment hatch 27 may have attached to its surface a plurality of conductive metallic type contacts 30. Metallic contacts 30, in conjunction with a plurality of metallic springs 72 located in the battery compartment 29, may complete the electrical path of the batteries enclosed in the battery compartment 29. When the battery compartment hatch 27 is properly installed on the computer terminal 10, it comes in contact with a conductive metallic rod 70 (FIG. 5) which extends the length of the battery compartment and is hard wired to battery supply connector 71, and completes the ground or negative potential path for the batteries. The enclosed batteries are arranged in battery compartment 29 in a series type configuration to provide the required voltage. The positive potential of the battery path is completed by the hard wiring of a metallic spring 72 to battery supply connector 71. Battery supply connector 72 contains a plurality of receptacles which mate with host board 37 to provide the battery power to the terminal 10. Battery compartment hatch 27 attaches to the bottom housing 12 of computer terminal 10 through the interlocking and meshing of identical but opposite railings on both the battery compartment hatch 27 and bottom housing 12. Battery compartment 29 is a cavity within computer terminal 10, with a somewhat rectangular opening 85 on which three corners are rounded and one corner is somewhat squared. Battery compartment 29 is formed in terminal 10 on bottom housing 12 when battery compartment cover 33 (FIG. 2) is attached thereon.

Battery pack 28 may be constructed of a plurality of nickel-cadmium battery cells, arranged in such a way as to provide approximately six volts of direct current electrical power. In addition, battery pack 28 may contain a formed metallic plate 31 which may be attached to said nickel cadmium batteries in such a way as to form a somewhat squared edge 31a, on one corner of the battery pack 28. The somewhat squared corner 31a of the battery pack 28 may correspond with the previously described somewhat squared corner on the rectangular opening of battery compartment 29, and may prevent the improper insertion of battery pack 28 in battery compartment 29. In addition, metallic plate 31 may be further formed to create a conductive metallic plate 32. When battery pack 28 is installed in computer terminal 10, metallic plate 32 engages probes 34 and 35 (FIG. 5) to create an electrically conductive path or short circuit between said probes 34 and 35. Probes 34 and 35 may form part of the battery charging circuit of the terminal 10 and may disable this circuit when not electrically shorted together, thereby preventing the inadvertent and possibly hazardous application of recharging electrical power to non-rechargeable (eg. alkaline) batteries.

Referring to FIG. 4, a lithium type battery 36 may be mounted upon a host printed circuit board 37 (FIG. 2) and retained in position by a non-conductive type of mounting pod 72. When installed, battery 36 may provide stand-by electrical power to ensure any data stored in the memory circuits of the invention is retained should the primary power supply drop below a predetermined level, and may further maintain the operation and memory of an integrated circuit type of real-time clock during the same conditions. The lithium battery 36 may be provided with a electrically non-conductive (e.g. mylar) strip 38 which, when installed between the battery 36 and a electrically conductive battery retaining clip 39, may prevent activation of the stand-by battery power during the aforementioned conditions until such a time as the non-conductive strip 38 is removed by the user. For ease of removal, non-conductive strip 38 may protrude through an opening 40, which may be located on the top end of computer terminal 10 and under the end cap 18 which may be attached thereto.

Electrostatic discharge (ESD) protection may be provided exclusively through circuit techniques and board mounted devices arranged in such a manner as to protect the entire electronic circuitry of computer terminal 10 from the potentially harmful effects of transient signal phenomena, including that introduced to the terminal 10 through any external connectors. The elimination of shielding devices commonly used to provide protection from said transient signal phenomena on previous types of portable computer terminals may enable lighter, molded polymeric materials to be used in the manufacturing process of certain components.

Figure 6:
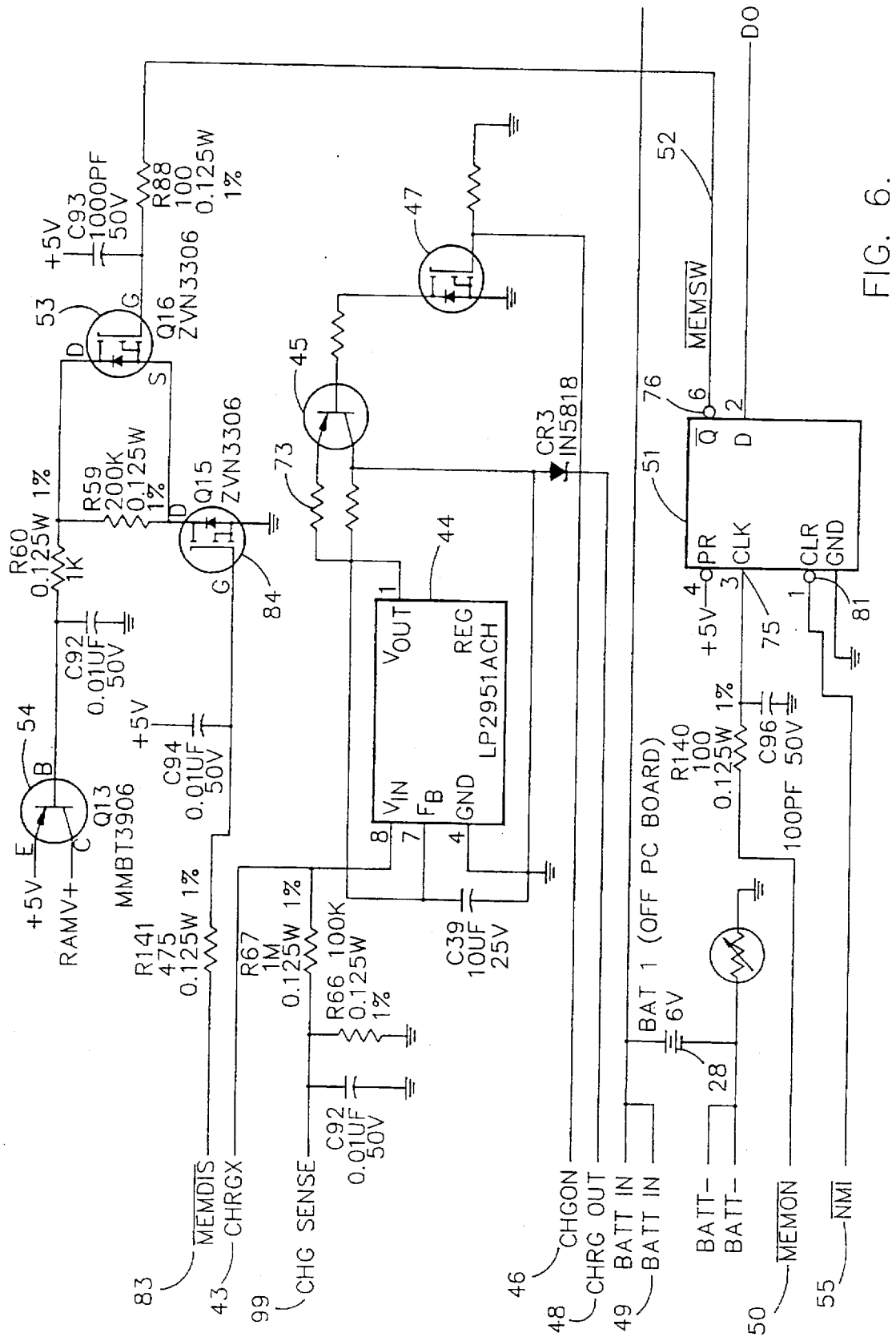
FIG. 6 is a schematic diagram of unique battery charging, low battery indicating, and sleep mode circuits used in the invention.

Referring to FIG. 6, the unique battery charging and terminal sleep mode circuits are illustrated. The battery charging circuit may be enabled only when rechargeable battery pack 28, capable of making a short circuit between the metallic probes 34 and 35 (FIG. 5), is properly installed in the battery compartment 29 as previously described. When computer terminal 10 is attached or otherwise connected to a compatible recharging device, a charging voltage may be introduced on the CHRGX line 43 (FIG. 6). The charging voltage on CHRGX line 43 may then be applied to a type of voltage regulating device 44. The regulated charging voltage output of regulating device 44 may be applied to a transistor type switch 45 through a resistor 73. Transistor switch 45 may be software controlled, and may be activated or turned on when the signal on CHGON line 46 changes state, which may cause field effect transistor 47 to change state, which then may cause transistor switch 45 to change state. Transistor switch 45 may provide a constant current charge through a diode CR3 to the installed battery pack 28, for a predetermined length of time. The charging current may be applied to installed battery pack 28 through the shorted metallic terminals 34 and 35. Metallic probe 35 (FIG. 5) corresponds to the CHRGOUT line 48 (FIG. 6) and metallic probe 34 (FIG. 5) corresponds to the BATTIN line 49 (FIG. 6).

The sleep mode circuitry of computer terminal 10 monitors the input activity of the terminal 10 and, when no activity is detected for a predetermined length of time, may cause the terminal 10 to shift to a stand-by or sleep mode to conserve the power supplied by the installed batteries. When in the inactive state, the memory array and real time clock circuits of terminal 10 require less power than when in an active state. In operation, when the terminal 10 has been inactive (e.g. no keys 56 are pushed on keypad 14) for a predetermined amount of time, MEMON line 50 may pulse. This pulse may be sensed on the CLK input 75 of flip-flop integrated circuit 51, which may cause its Q output 76 to switch levels. Resistor R140 and capacitor C96 may ensure no false signals are received by flip-flop 51. The Q output 76 of flip-flop 51 is designated MEMSW line 52. The state of MEMSW line 52 may cause field effect transistor 53 to change states. MEMSW line 52 may be filtered by resistor R88 and capacitor C93. When field effect transistor 53 changes states, it greatly reduces the amount of current flowing through the base of transistor 54 by causing resistor R59 to be placed in series with resistor R60. The greatly reduced current flow through the base of transistor 54 allows the regulated supply of the terminal 10, provided by the power of the installed batteries applied through a voltage regulating device, to provide less current to the integrated circuit type of real time clock and the inactive memory array of the terminal 10, thus increasing the active, life of the installed batteries.

When terminal 10 again becomes active (e.g. a key 56 is pushed on keypad 14) NMI line 55 may pulse. The pulse on NMI line 55 may be sensed by flip-flop 51, on its CLR input 81, and may then cause its Q output 76 to change states. The state of MEMSW line 52 on the Q output 76 of flip-flop 51 may now cause field effect transistor 53 to shift to its former state, returning current flow through the base of transistor 54 to its active level.

The computer terminal 10 may operate exclusively from the power supplied through a regulating device by the installed batteries (e.g. battery pack 28, FIG. 2) until the MEMDIS line 83 changes states. MEMDIS line 83 may change states when the installed batteries or attached charger do not provide sufficient voltage to operate the terminal. When MEMDIS line 83 changes states, it may change the state of field effect transistor 84. MEMDIS line 83 may be filtered by resistor R141 and capacitor C94. When field effect transistor 84 changes state it may disable the current flow path through the base of transistor 54, effectively removing the regulated supply of terminal 10 from the memory array. When this occurs, standby lithium battery 36 (FIG. 4) or a charged capacitor may supply the memory array and real time clock circuits until such time as the main power supply is returned to the level required to power the terminal 10. A charged capacitor may provide short term back-up power for the terminal 10, with the lithium battery 36 providing power when the stored charge of the capacitor is depleted. Lithium battery 36 may provide long term back-up power. When the main power of terminal 10 is restored to an operational level, MEMDIS line 83 may return to its former state which may restore normal current flow through the base of transistor 54.

Figure 3:
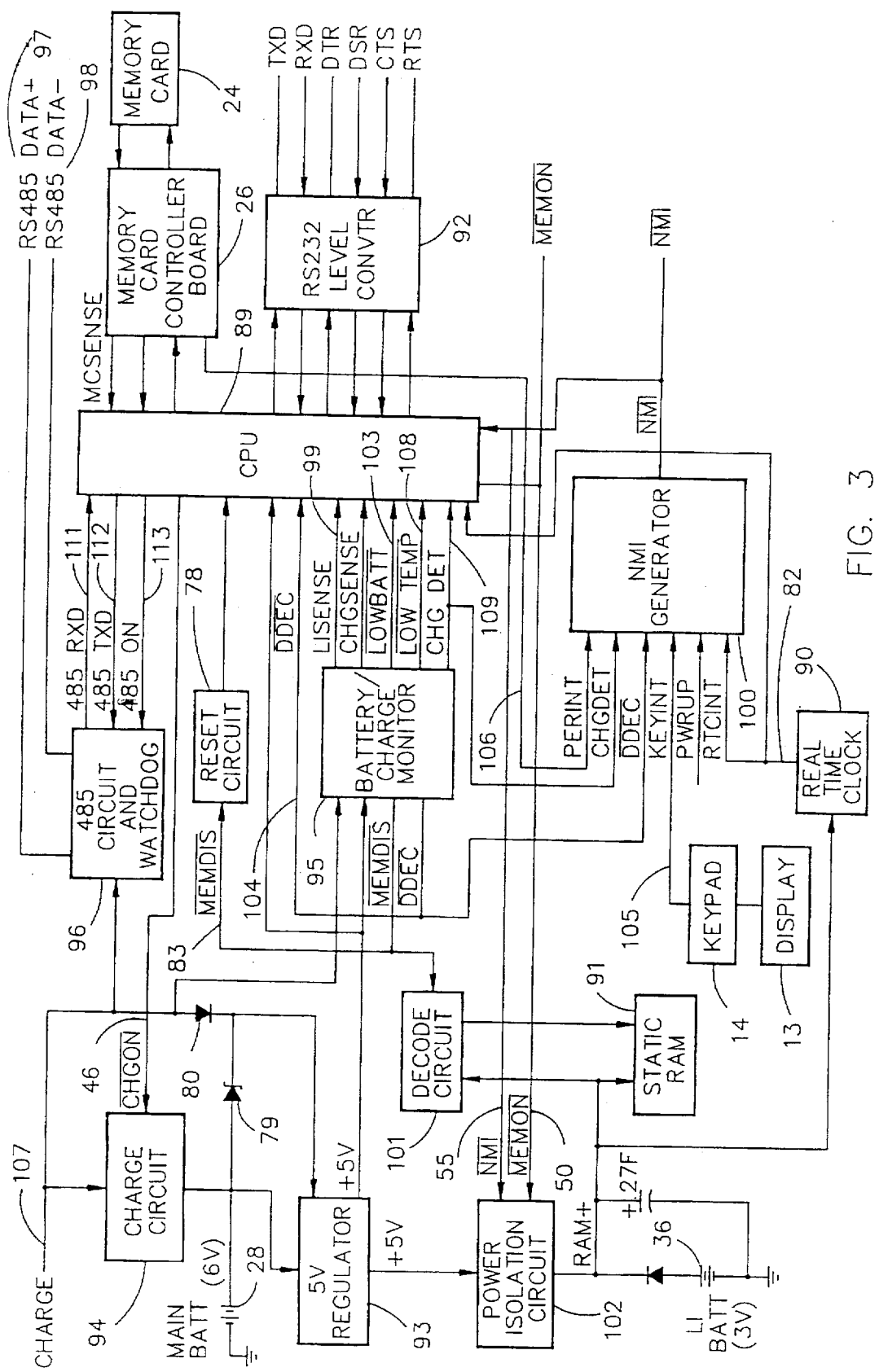
FIG. 3 is a block diagram showing the major electronic circuits and/or components of the present invention and the interconnections between them.

Referring now to FIG. 3, the terminal 10 functional block diagram is illustrated and will be discussed in the following paragraphs.

The central processor unit (CPU) 89 may contain program storage and reside on the host printed circuit board. CPU 89 controls all terminal functions and is the locus where machine instructions are carried out and data communication with devices inside and outside the terminal 10 is controlled. However, it may allow an optional auxiliary processor unit on the memory card controller board 26 to control some external access (e.g. reading from and/or writing to a memory card 24). The CPU 89 may abort all communications throughout terminal 10 should power available from the main batteries (e.g. nickel-cadmium battery pack 28) drop below a predetermined level. All access to static RAM 91, the real time clock 90, the keypad 14 and keypad circuit board 41, and display 13 and display circuit board 43 are accomplished through CPU 89. The CPU 89 also controls the level of charging current applied to battery pack 28 on CHGON line 46 and generates a signal on MEMON line 50 to initiate the sleep mode described earlier. In addition, CPU 89 allows activation of the 485 circuit and watchdog timer 96, RS232 level converter 92, and the backlight of display 13.

The memory in static RAM 91 is decoded in the decode circuit 101. MEMDIS line 83 is coupled with this circuit and will inhibit access to static RAM 91 in the event the 5 volt regulator 93 has dropped out of regulation, indicating the installed batteries (e.g. nickel cadmium battery pack 28) are no longer providing the necessary voltage. In the preferred embodiment of the invention, memory in the static RAM 91 may be selectively configured in one of varying sizes.

The terminal 10 may be equipped with a battery/charge monitor circuit 95 as well as a battery charge circuit 94. The battery/charge monitor circuit 95 monitors the level of power in the main battery and provides a signal on LOW- BATT line 103 if battery voltage drops below a certain value. The signal on LOWBATT line 103 informs the CPU 89 that battery power is getting low, and CPU 89 in turn will notify the user through the display 13. The terminal 10 will continue to operate normally as long as the LOWBATT line 103 receives no signal. If LOWBATT line 103 receives a signal, the terminal 10 will go to its inactive (sleep) state, but will be allowed to become active if a key 56 (FIG. 1) is pressed. The next signal that is monitored is the DDEC line 104. DDEC line 104 provides indication if the five volt regulator 93 begins to drop out of regulation. When DDEC line 104 trips, the terminal 10 goes to sleep immediately, saving all data in the static RAM 91, which will have backup power in the event that the main batteries are removed. Finally, when the output of the main batteries (through 5 volt regulator 93) drops to a predefined level, MEMDIS line 83 will carry a signal, causing the static RAM 91 to be disabled, the CPU 89 to be reset via a reset circuit 78 and the transistor 54 (FIG. 6), located in the power isolation circuit 102, to open as described previously. The CPU 89 is equipped with an analog input port which allows it to monitor several other battery/charge conditions. The signals available at this port may provide information regarding the charge level, the voltage level of lithium battery 36, and the voltage level of any power source in the memory card 24 (if one is present). Other signals which may be monitored here are an extended duration signal emanating from the KEYINT line 105. The memory card controller board 26 may also provide an interrupt signal on PERINT line 106, which is made available to the CPU 89 on this analog port.

The charge circuit 94 is disabled unless a shorting mechanism, (conductive metallic plate 32, FIG. 2) which is located on and part of the nickel-cadmium battery pack 28, is present and properly installed in the battery compartment 29 (FIG. 5) as described previously. Charging of an Installed nickel-cadmium battery pack 28 occurs automatically when a charge voltage of a predetermined value is present on CHARGE line 107. Charging of the installed nickel-cadmium battery pack 28 may occur selectively at a rate of approximately 20 milliamps or a rate of approximately 75 milliamps, and is determined by the terminal software through CPU 89. The CPU 89 also monitors the ambient air temperature and, if below a predetermined level, preferably approximately 5° C., the CPU 89 causes the LOWTEMP line 108 to provide a signal, which causes constant current charge to default to the lower charge (20 milliamps) rate. When terminal 10 is first attached or otherwise connected to a charger, the CHGDET line 109 goes active for approximately four milliseconds, then returns to its inactive state. This causes NMI generator 100 to generate a pulse to wake the terminal 10 from its sleep mode and let it know that a charger is present.

A charger must be attached to terminal 10 for the 485 circuit and watchdog 96 to function, as this circuit is powered by the charger. The 485 circuit and watchdog circuitry 96 may provide the terminal 10 with a communications port capable of synchronous two-way data communication with other compatible devices, transferring data at a rate not greater than five hundred thousand bits per second, according to the predominate RS485 protocol as defined by the Electronic Industries Association. When CPU 89 detects the presence of a charger, it activates the 485 circuit and watchdog through 485ON line 113. Data may then be transmitted and received by terminal 10 on RS485 DATA+ line 97 and RS485 DATA-line 98, said lines being hard wired to a pair of a number of coplanar, generally parallel and evenly spaced conductive metallic pads 110 (FIG. 5).

Received data is applied to the CPU 89 from the 485 circuit and watchdog 96 on 485RXD line 111, while transmitted data is applied to the 485 circuit and watchdog 96, from CPU 89, on 485TXD line 112.

Five volt regulator 93 may operate from either the main battery supply or an attached charger. If both are present, the output voltage of the charger will be higher than the battery voltage, causing 5 volt regulator 93 to choose current from the charger supply rather than the batteries. This feat is accomplished with a type of "diode OR gate" comprised of diodes 79 and 80.

Terminal 10 has been designed to be in an inactive state (sleep mode) for the majority of time to conserve battery power. As described previously, NMI line 55 must be pulsed for terminal 10 to wake up and begin program execution. The pulse on NMI line 55 is generated by the NMI generator 100 and may be generated by a pulse on KEYINT line 105 from the keypad 14, a pulse on RTCINT line 82 from the real time clock 90, simultaneous pulses on LOWBATT line 103 and DDEC line 104, a pulse on CHGDET line 109, a pulse on PERINT line 106 from memory card controller card 26, and a pulse on, POWERUP line from the 5V regulator 93.

Power is applied to the memory card controller board 26 under CPU 89 control. Once the memory card controller board 26 power is stable and the memory card controller board 26 microprocessor is stable, the memory card controller board 26 microprocessor begins a unique sequence of hand shaking with CPU 89 to establish a communication link. This link has some software support to monitor data integrity throughout the transfer of data. The memory card controller board 26 is equipped with a pair of analog switches which isolate the data bus on the memory card controller board 26 from the data bus on the host printed circuit board 37. This isolation prevents inadvertent data bus interference during the power up routine of the memory card controller board 26 microprocessor. The memory card controller board 26 microprocessor controls all address and data bus generation required to access memory card 24. The power to the memory card 24, is enabled by a sequenced combination of signals both from the CPU of the host board 37 and the microprocessor of the memory card controller board 26. When power to memory card 24 is off, the contents of the random access memory (RAM) of memory card 24 may be maintained by a lithium battery located on and part of memory card 24, unless a charger is attached to terminal 10, in which case power for memory card 24 will be supplied by the charger.

Referring now to FIGS. 7-11, an alternative embodiment of the invention is disclosed. Terminal 115 as shown in FIGS. 7 and 8 comprises a main terminal portion 116 which differs somewhat in internal construction as compared to the main terminal portion of FIGS. 1-6, since it is adapted for radio frequency communication via an antenna 117 of a special RF adapter end cap 118. Terminal portion 116 is generally similar to the terminal 10 of FIG. 1 of the drawings, with the end cap 18 thereof removed.

Terminal portion 116 is provided with a display 13 and a keyboard 14 having a plurality of keys 56. Keys 56 are depressed by the user to enter data and to control the functions of terminal 115, including causing terminal 115 to transmit or receive data by radio transmission means. Display 13 provides visual information to the user.

Figure 11:
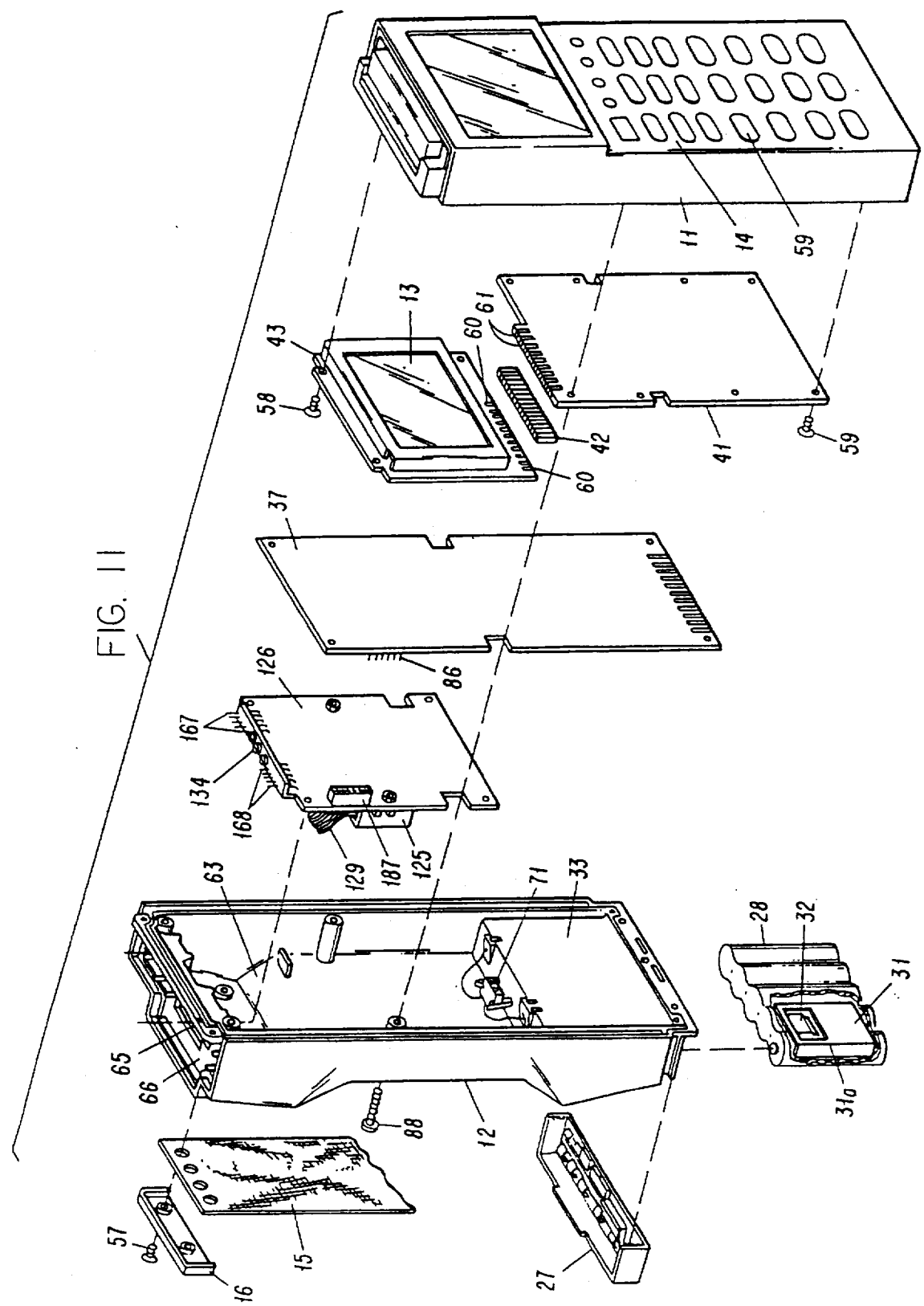
FIG. 11 is an exploded perspective view showing the principal components of the main terminal portion of the embodiment of FIGS. 7, 8 and 9 (exclusive of the end cap which is shown in the exploded perspective view of FIG. 10)

Referring to FIG. 8, it can be seen that end cap 118 is removably mounted to terminal portion 116. Connector 119 is mounted to end cap 118 for interconnection to optional input or output peripheral devices. Connector 119 is electrically connected through wiring 120 to connectors 122 and 123 which are mounted to connector platform 121. Connectors 122 and 123 engage pins 167 and 168 of peripheral controller card 126 (as shown in FIG. 11) when end cap 118 is mounted to terminal portion 116.

Radio module 127 mounts within end cap 118 by suitable mounting means such as screw 128. Radio module 127 is electrically coupled to peripheral controller card 126 by ribbon cable 129. Ribbon cable 129 is detachably connected to radio module 127 at connector 130 and enters terminal portion 116 through opening 65 in wall 66 wherein it engages peripheral controller card 126 thereby electrically interconnecting radio module 127 and the peripheral controller card 126.

Adjusting elements 131 are provided on radio module 127 for frequency tuning and signal level adjustment purposes.

Referring now to FIG. 10, it can be seen that end cap 118 comprises housing members 132 and 133 which may be separated when end cap 118 is removed from terminal portion 116 in order to provide access to adjusting elements 131 of radio module 127.

Figure 9:
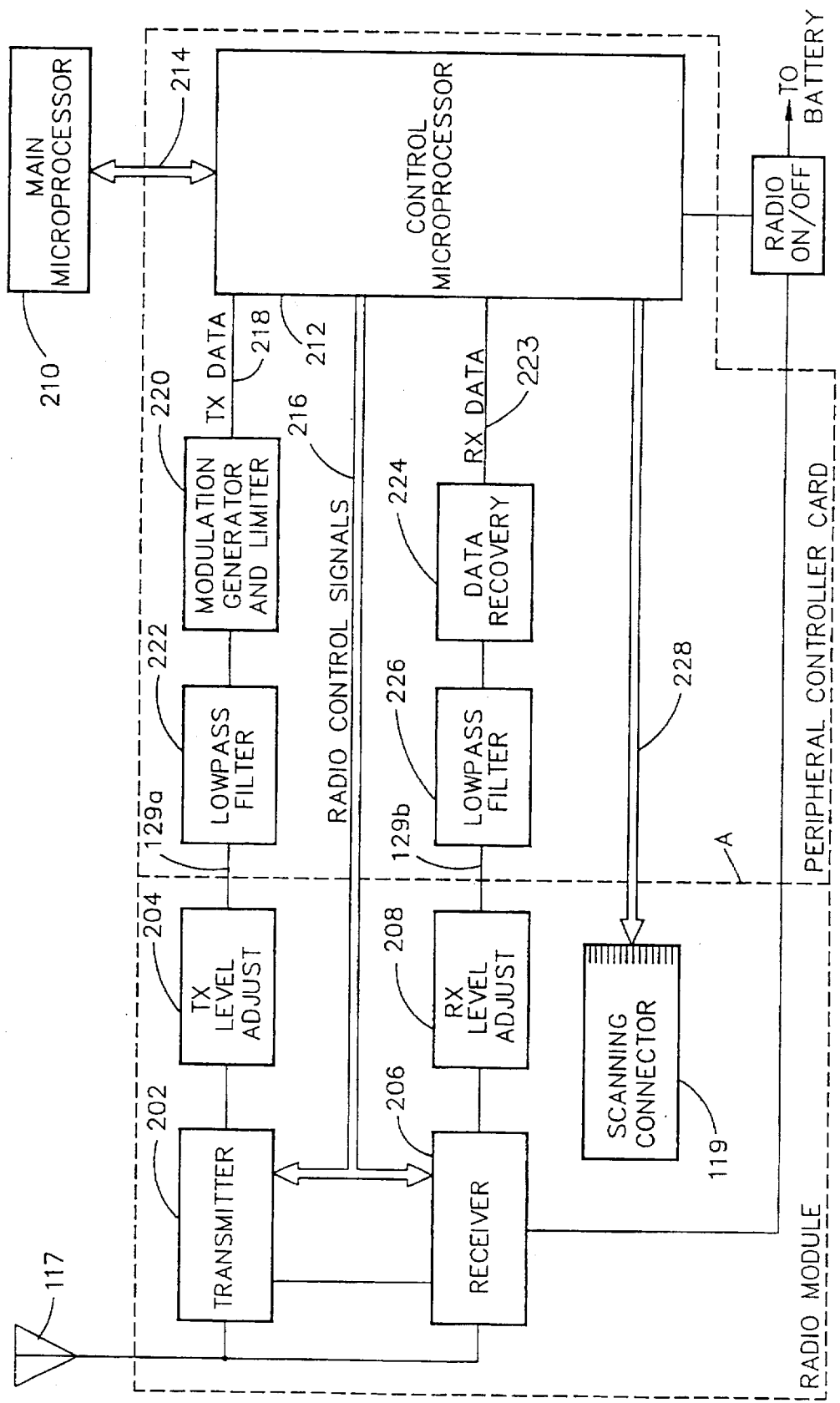
FIG. 9 is a block schematic diagram showing the electronic system components of the alternative embodiment of FIG. 7.

Referring to the block diagram of FIG. 9, it can be appreciated that radio module 127 houses thereon transmitter 202 which is coupled to antenna 117. Transmitter 202 is coupled to transmit level adjust circuitry 204. Receiver 206 is likewise coupled to antenna 117 and to receive level adjust circuitry 208. Dashed line A separates the components located on radio module 127 from components located on peripheral controller card 126. Control microprocessor 212 communicates with main microprocessor 210 of terminal portion 116 through coupling means 214. Control microprocessor 212 is coupled to transmitter 202 and receiver 206 by coupling means 216 along which are communicated radio control signals. Data to be transmitted from terminal portion 116 is provided by control microprocessor 212 over TX data line 218 to modulation generator and limiter 220. Modulation generator and limiter 220 is coupled to first low pass filter 222. Data received by antenna 117 is delivered to control microprocessor 212 on RX data line 223 which couples control microprocessor 212 to data recovery element 224 which is coupled to second low pass filter 226. Lines 129a and 129b are part of ribbon cable 129 and serve to couple the circuitry of peripheral controller card 126 to radio module 127.

Connector 119 is coupled to control microprocessor 212 by scanning interface signals line 228.

Referring to FIG. 11, the internal components of the terminal portion 116 can be visualized. Structure identical to that of the preferred embodiment of FIG. 1 has been identified with identical identifying numerals. Top housing part 11 and bottom housing part 12 are secured together such as by screw 88 to provide an enclosure for display printed circuit board 43, keyboard printed circuit board 41, host printed circuit board 37 and peripheral controller card 126. Liquid crystal display 13 is carried on display printed circuit board 43. Keyboard printed circuit board 41 electrically connects to display printed circuit board 43 by means of resilient conductive pad 42 which is retained between connector elements 60 of display printed circuit board 43 and connector elements 61 of keyboard printed circuit board 41. Screw 59 retains keyboard printed board 41 to top housing part 11. Screw 58 retains display printed circuit board 43 to top housing part 11.

Host printed circuit board 37 includes a central processing element and associated control circuitry to control the operation of the terminal portion 116. Host printed circuit board 37 is electrically connected to peripheral controller card 126 by the engagement of pins 86 of the host printed circuit board with receptacle 187 of peripheral controller card 126.

Depending from peripheral controller card 126 are conductive pins 167 and 168. These conductive pins 167 and 168 engage connectors 122 and 123 of connector platform 121 (FIG. 8), thereby providing electrical pathways from peripheral controller card 126 to the sockets of connector 119 mounted on end cap 118.

As shown in FIG. 11, the ribbon cable 129 attaches to the peripheral controller card 126 at connector 125. Peripheral control adjustment elements 134 are mounted to peripheral controller card 126 such that peripheral control adjustment elements 134 are accessible to the user through opening 65, thereby obviating the necessity of any disassembly of terminal portion 116 in order to effect adjustments to the peripheral controller card 126.

Battery pack 28 is received in cavity 29 (FIG. 5) of terminal portion 116 and is retained within the cavity by hatch 27. Flexible strap 15 is retained to bottom housing part 12 by clamp 16 fastened by screw 57.

In operation, the user may remove end cap 118 from terminal portion 116 when adjustment of radio components is desired. Adjusting elements 131 may be accessed by the separation of housing member 132 and 133 while radio module 127 continues to be electrically connected through ribbon cable 129. In addition, peripheral control adjustment elements 134 of peripheral controller card 126 may be accessed when end cap 118 is removed from terminal portion 116. The user may communicate with a remote host computer in "real time" by operation of keyboard 14 which provides signals to main microprocessor 210 (FIG. 9). Main microprocessor 210 processes the signals and communicates them to control microprocessor 212 of peripheral controller card 126. Control microprocessor 212 and its associated circuitry on peripheral controller card 126 processes the signals to superimpose them upon radio transmission frequencies, and communicates the processed signals to transmitter 202 which is coupled to antenna 117 and which thereby causes their transmission through space from antenna 117 by electromagnetic radiation. A remote host computer responding to terminal 115 transmits radio frequency signals which are received by receiver 206 through antenna 117. Received signals are demodulated on peripheral controller card 126 and are provided to control microprocessor 212 which communicates the processed signals to main microprocessor 210 which causes the production of display information upon display 13 so that it can be observed by the user.

The disclosure of the following co-pending applications including the drawings are hereby incorporated herein by reference in their entireties:

(1) U.S. application Ser. No. 07/660,615 filed Feb. 25, 1991, (Attorney Docket No. 36767XZ (now U.S. Pat. No. 5,218,187, issued Jun. 8, 1993)).

(2) U.S. application Ser. No. 07/467,096 filed Jan. 18, 1990, (Attorney Docket No. 37139 (now U.S. Pat. No. 5,052,020, issued Sep. 24, 1991)).

(3) U.S. application Ser. No. 07/674,756 filed Mar. 25, 1991 (Attorney Docket No. 36767YX) as a continuation-in-part of the U.S. application item (1) above.

(4) PCT International application PCT/US91/00435 filed Jan. 18, 1991 (Attorney Docket No. 37139X), and claiming priority based on the U.S. application item (2) above.

Figure 12:
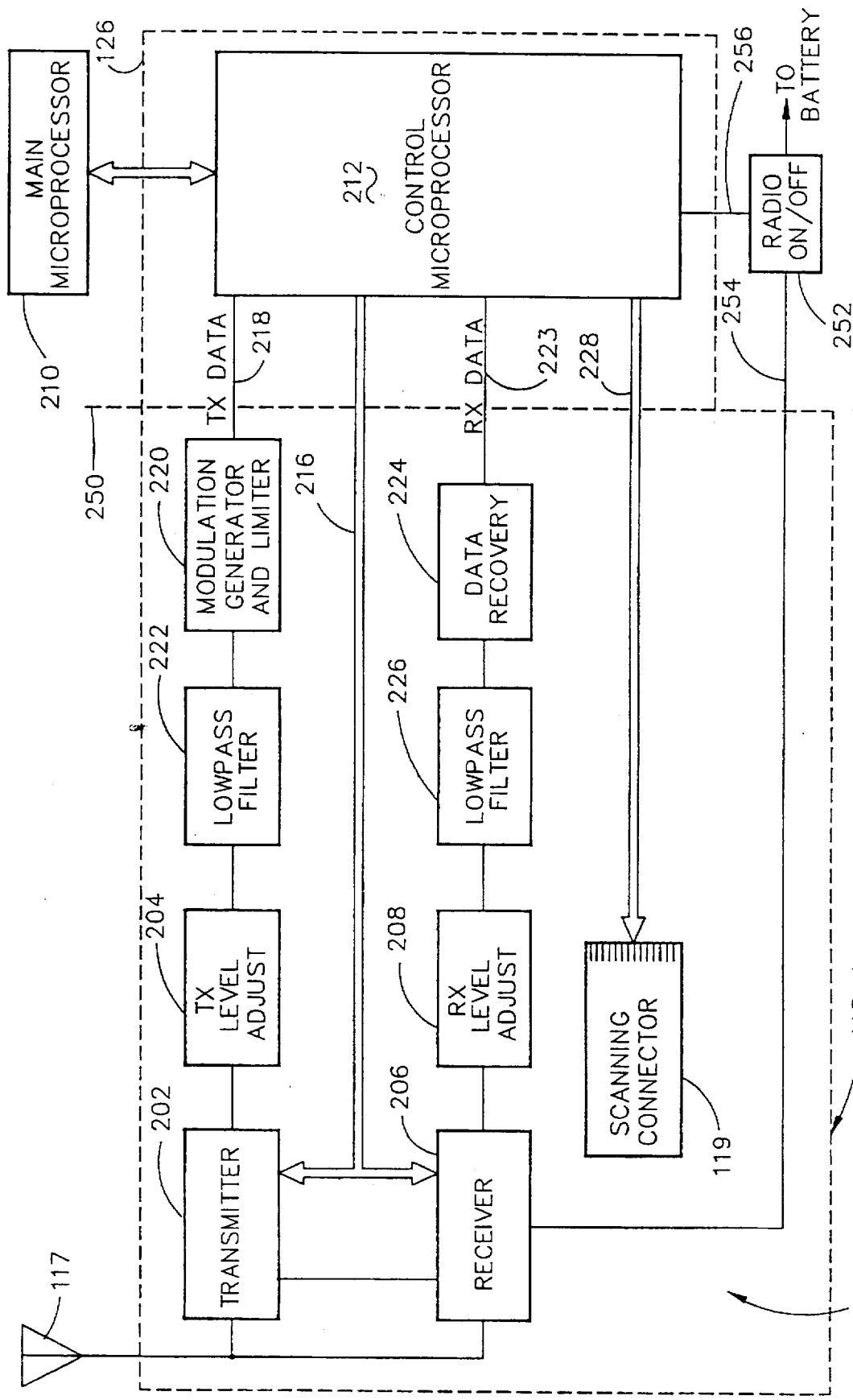
FIG. 12 is a block schematic diagram similar to FIG. 9, but showing an improved circuit arrangement for facilitating interchangeability of the RF end cap module and in particular avoiding the need for any turning adjustments when an RF end cap module is applied to the basic terminal in the field.

Description of FIG. 12

FIG. 12 shows a modification of the embodiment of FIG. 9 which enables the replacement of the RF adaptor module without requiring a turning adjustment of the module. In this embodiment the control microprocessor 212 is on the peripheral controller card, while components 220, 222, 224 and 226 are included in the radio module 106-1 forming part of the RF modular adapter end cap 118-1. This results in a digital interface at 250 between the peripheral controller card of the basic terminal and the radio module of the RF adapter end cap.

Since the signals transmitted across the digital-interface are at standardized logic levels, there is no need for tuning adjustment of the RF module to adapt it to a particular basic terminal. Lines 216, 218 and 223 may form part of a ribbon cable corresponding to cable 108 with a connector corresponding to connector 109 for plug-in coupling with a mating connector of radio module 106-1. Multiconductor line 228 may be implemented via mating connectors such as 67, 22 and 68, 23 (FIG. 2) as in the previous embodiments. In each embodiment, power from the battery pack 28 may be supplied to the circuitry of the RF end cap under the control of a radio on/off switch 252, the power supply path 254, FIG. 12, being comprised by conductors of a ribbon cable such as 108, for example. The control microprocessor 212 is coupled with switch component 252 as indicated at 256, so that all power to the RF end cap can be switched on and off as required to minimize battery drain.

Since the peripheral circuit means including 212, FIG. 10, only transmits standardized digital signals and battery power to the modular adaptor end cap, the end cap circuits can be preadjusted at the factory and adjustments by the end user in assembling the modular adaptor end cap with the terminal can be avoided. The peripheral circuit board 26 (FIG. 2) and end cap 18 can be replaced by peripheral controller board 126, FIG. 12, and the end cap 118-1 with radio 106-1, without requiring any other hardware changes in the terminal. Then the end cap with radio module 106-1 can be replaced with a new identical end cap as needed without requiring any adjustments in the digital outputs from the peripheral controller board, and without requiring any turning adjustments of the modular adaptor end cap.

To replace the modular adaptor end cap 118-1 with the RF module 106-1, the end cap is removed as in FIG. 8, and the RF section 106-1 separated at connector 130, FIG. 8. A new end cap is then coupled with ribbon cable 129 by means of connector corresponding to 130. This completes the new digital signal paths which are as represented at 216, 218, 223, 254, FIG. 12.

Example According to FIG. 12

In an exemplary embodiment according to FIG. 12, the basic hand-held terminal configuration formed from housing parts 11 and 12, FIG. 2, has peripheral adaptor circuit means 126, FIG. 12, connected therewith via peripheral connector means similar to 129, 130 (FIG. 8), accessible at the upper end of the terminal configuration (see FIG. 8). The basic terminal selectively receives a compatibility end cap (e.g. 18, FIG. 2) for enclosing the upper end and providing a resultant hand-held terminal of dimensions compatible with an existing terminal receptacle, e.g., of a portable printer. In the portable printer the receptacle for the terminal has an electrical connector at one end for mating with connector 19, FIG. 1, and a spring-urged retainer at an opposite end for retaining the terminal in operative relation to the printer receptacle.

Where it is anticipated that the terminal configuration is to be later adapted to provide an RF link to an external transceiver, the basic terminal configuration may be provided with peripheral adapter circuit means such as represented at 126, FIG. 12. The peripheral input/output means at digital interface 250, FIG. 12 may be embodied in a cable and connector (such as 129, 130, FIG. 8) which is passively contained within a compatibility end cap module such as 18, FIG. 1, but is ready for plug-in connection with RF module 127-1, FIG. 12, of a modular adaptor end cap 118-1, FIG. 12.

Description of FIGS. 13–18

Figure 13:
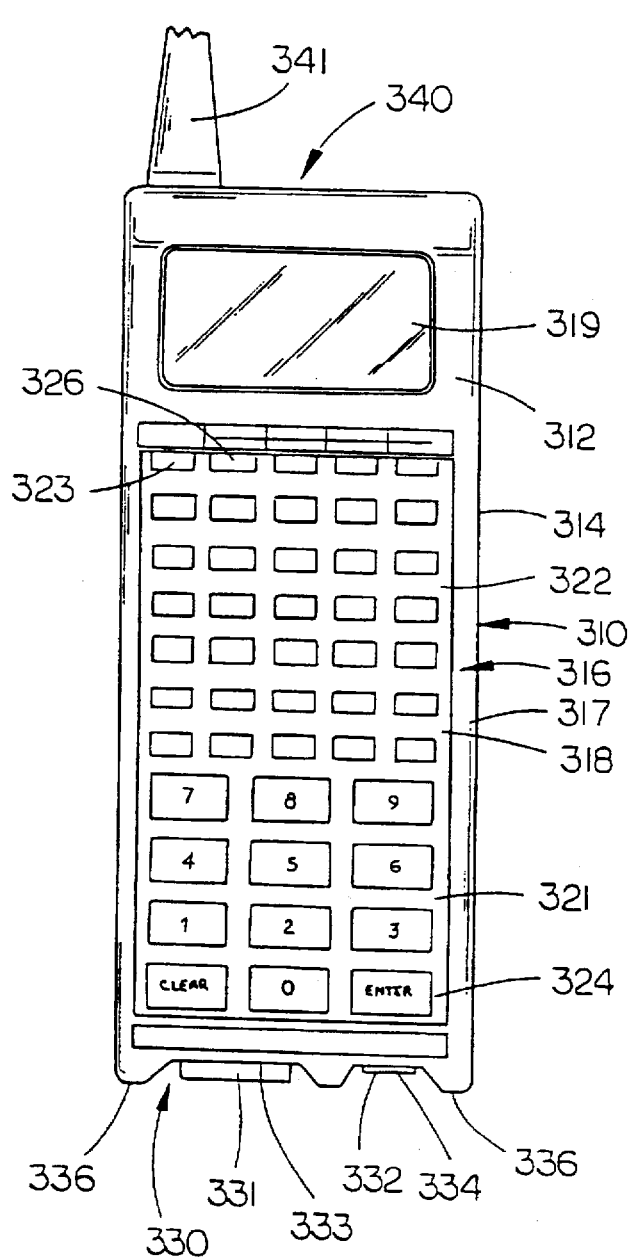
FIG. 13 shows a frontal view of a modular data terminal and showing a frontal or upward directed face of the data terminal, as it would typically face an operator of the data terminal.
Figure 14:
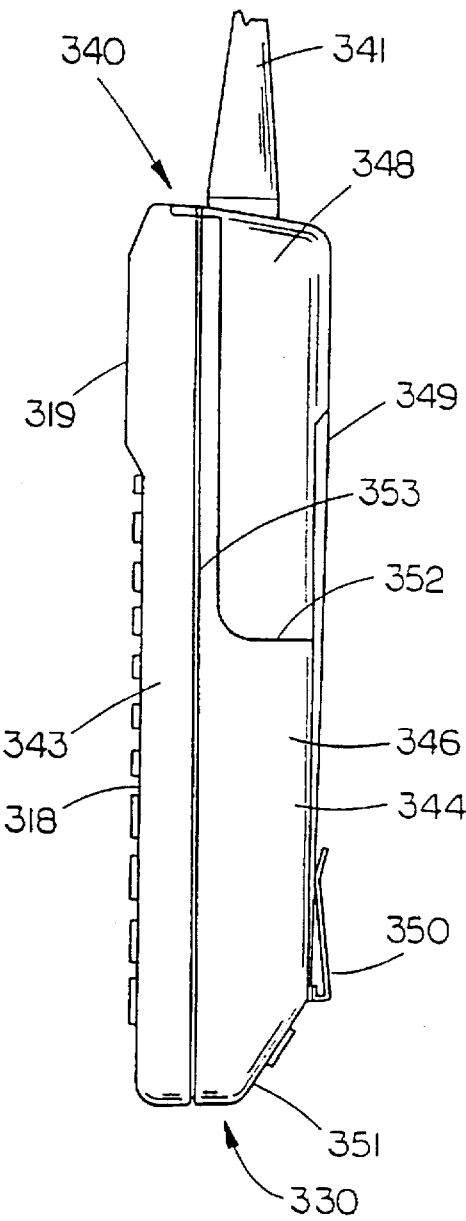
FIG. 14 is a side view of the data terminal shown in FIG. 13.

Referring now to FIGS. 13 and 14, a data collection terminal unit, also referred to herein as data terminal, is designated generally by the numeral 310. As shown in FIG. 13, a frontal face 312 of an elongate housing 314 of a base module 316 of the data terminal 310 typically faces upward and is accessible to the user of the data terminal. The upward facing portion of the module 316 houses a keyboard module 317, including an alphanumerical keyboard 318 and a display screen 319. The display screen 319 is in a preferred embodiment described herein a 4-line by 16-character Reflective Super Twist Liquid Crystal Display (LCD). Of course, other display means may be used in its stead. The keyboard 318 includes a lower, standard numerical keyboard section 321, and an alphabetical keyboard arrangement 322. An On-Off power key 323 is preferably placed in a left-most position of an uppermost row on an uppermost row of five keys. The outermost keys 324 in a bottom row are configured as "CLEAR" and "ENTER", while the remaining four keys in the uppermost row are preferably configured as a set of four user-defined function keys 326.

At a bottom end 330 of the housing 314, there are located two connector plugs 331 and 332 in recesses 333 and 334, respectively. Inasmuch as the connectors 331 and 332 are disposed in the recesses, adjacent end and interleaved protrusions 336 of the housing 314 extend somewhat past the connectors to protect the connectors from damage should the data terminal accidentally be dropped or set down on the bottom end 330. A preferred embodiment of the data terminal 310 is intended to withstand, without damage, a drop of about 1.2 meters to a solid surface, such as concrete. The preferred connector 331 is an input-output port, as may be used for such data collection as bar code reading, for example. In such instance, the connector 331 is preferred to be a 9-pin D-subminiature connector with pins interfacing to typical 5 volt scanning peripherals. The connector 332 may be used for accessing external power sources or provide of combined power and data communication. A circular miniature DIN-type connector 332 may be used in the preferred embodiment. A top end 340 of the preferred embodiment of the base module 316 typically may not include connectors. An antenna 341 shown to extend above the top end 340 is further described in reference to FIG. 13.

FIG. 14 is a side view of a data terminal 310 of FIG. 13. The base module 316 of the data terminal 310 includes an elongate upper housing portion 343 and a battery compartment 344 attached to the upper housing portion 343 adjacent the bottom end 330. In the preferred embodiment, the battery compartment 344 is assembled as a lower housing portion to the upper housing portion 343 and is equipped with a battery compartment door 346 which may be locked to seal an opening of the battery compartment 344. Adjacent the top end 340 of the data terminal 310 a data and communications module 348 is attached to the lower edge housing portion 343. The antenna 341 extends upward from the data and communications module 348 above the top end 340 of the data terminal 310. An elastic hand strap 349 is attached to the underside of the data terminal 310. A belt clip 350 may conveniently be mounted to the hand strap 349, allowing the data terminal to be carried on a user's belt. The elastic hand strap is attached adjacent the top end of the data terminal to the underside of the data and communications module 348 and adjacent the bottom end 330 to a sloped lower surface of the battery compartment 346.

One of the features of hand-held data terminals as disclosed herein and in the PCT application PCT/US90/03282 incorporated herein by reference relates to the exchangeability of modules of different shape and varied function. The data and communications module 348 in FIG. 14 may for example include a radio module which is externally identified by the antenna 341. The radio module may be a commercially available pretuned 1-watt (UHF) frequency modulated (FM) radio transceiver module, or any similar radio module, such as a Motorola P10™ radio model, for example.

In accordance herewith it is contemplated to provide the data and communications module 348 as a module which is readily replaceable with another data and communications module. Each such module will feature a quick exchange mounting mechanism, such as is more clearly illustrated with respect to FIG. 15, and any of a number of features packaged in one of a number of compatible data and communications modules. When mounted, the module, such as the data communications module 348 is matched in a contour continuation along a juncture 352 to the adjacent edge of the battery compartment 344 and along a longitudinal parting line 353 of the base module 316. For example, the data and communications module 348 is sized to include the described radio frequency transceiver module, as indicated by the antenna 341. Other data and communications modules may include a similar radio frequency transceiver module and may include additional memory capacity to function with the base module 316. Various combinations of features are contemplated in accordance herewith.

FIG. 15 shows the base module 316 and substantially in a ready position to become mounted to the base module 316 is a data and communications module designated generally by the numeral 355. The data and communications module 355 is shown to represent generally a number of such data and communications modules which may be desirably incorporated into a communications system in accordance with the Invention. It may be noted that the data and communications module 355 is shown in FIG. 15 as being of somewhat relatively greater depth or thickness than the data and communications module 348 described with respect to FIG. 13. The change in outer dimensions illustrates that a number of modules of various depths are adapted to match with mounting provisions to attach the respective data and communications module 355 to the base module 316.

The data and communications module 355, as a representative module featuring the attachment to the base module 316 has a plurality of laterally disposed latching hooks or latch hooks 356 which become engaged by respective latching seats or latch seats 357 disposed along the adjacent edge of the base module 316 when the module 355 is moved toward and into engagement with the adjacent edge and then toward the battery compartment 344, as shown by the arrow 358. Electrical communication is established via a power and communications connector 361 the pins of which engage a mating connector socket 362 within the base module 316. A set of screws 363 may be tightened through the battery compartment 344 into a set of threaded seats 364 disposed in the adjacent wall of the module 355 to securely retain the attached module as an integrated part of the data terminal 310. At the top end of the data terminal 310, a lip or extending stop edge 366 of the module 355 engages a complimentarily shaped seat 367 at the top end of the base module 316 to securely interlock the data and communications module 355 with the base module 316.

It is contemplated, for example, for the module 355 to include any of a number of combinations of diverse functional elements. For example, the module 355 may include the aforementioned transceiver, though the antenna 341 may be attached externally as shown in FIG. 14 or might be provided internally, in addition to extended data memory capacity, a modem or a reader of indicia of information may be included, such as bar code reader, or a shelf tag reader. Shelf tag systems are known in which so-called "shelf tags" contain means for programming information into small display devices which are attached to front edges of merchandise storage shelves. The devices or tags would then retain the programmed data which may be acquired by the reader in the data and communication module 355, for example. Information may be communicated between the shelf tag and the data terminal 310 by various means including radio frequency or optical transmission. Information may be communicated via optical readers in the data and communications terminal 316 as read from liquid crystals, or by other communication such as infrared optical, or low power RF data messages.

FIG. 16 shows an alternate embodiment of the data terminal 310 in which the data terminal includes a data and communications module which includes, for example, a radio frequency transceiver module and a CCD scanner module which may be disposed in a lower portion of the module at 376, having a scanning window at 377. Since it may be desirable to position the scanning window near a surface at which data indicia such as bar code labels may be located, as indicated at 378, the antenna which also protrudes from the top end of the data terminal 310 is found to be interfering when disposed in a normally protruding position. It is therefore contemplated to arrange the antenna 341 in a manner in which it may be pivoted from an upwardly protruding position, such as shown in phantom lines at 381 to a tilted position such as shown by the antenna 341.

Figure 17:
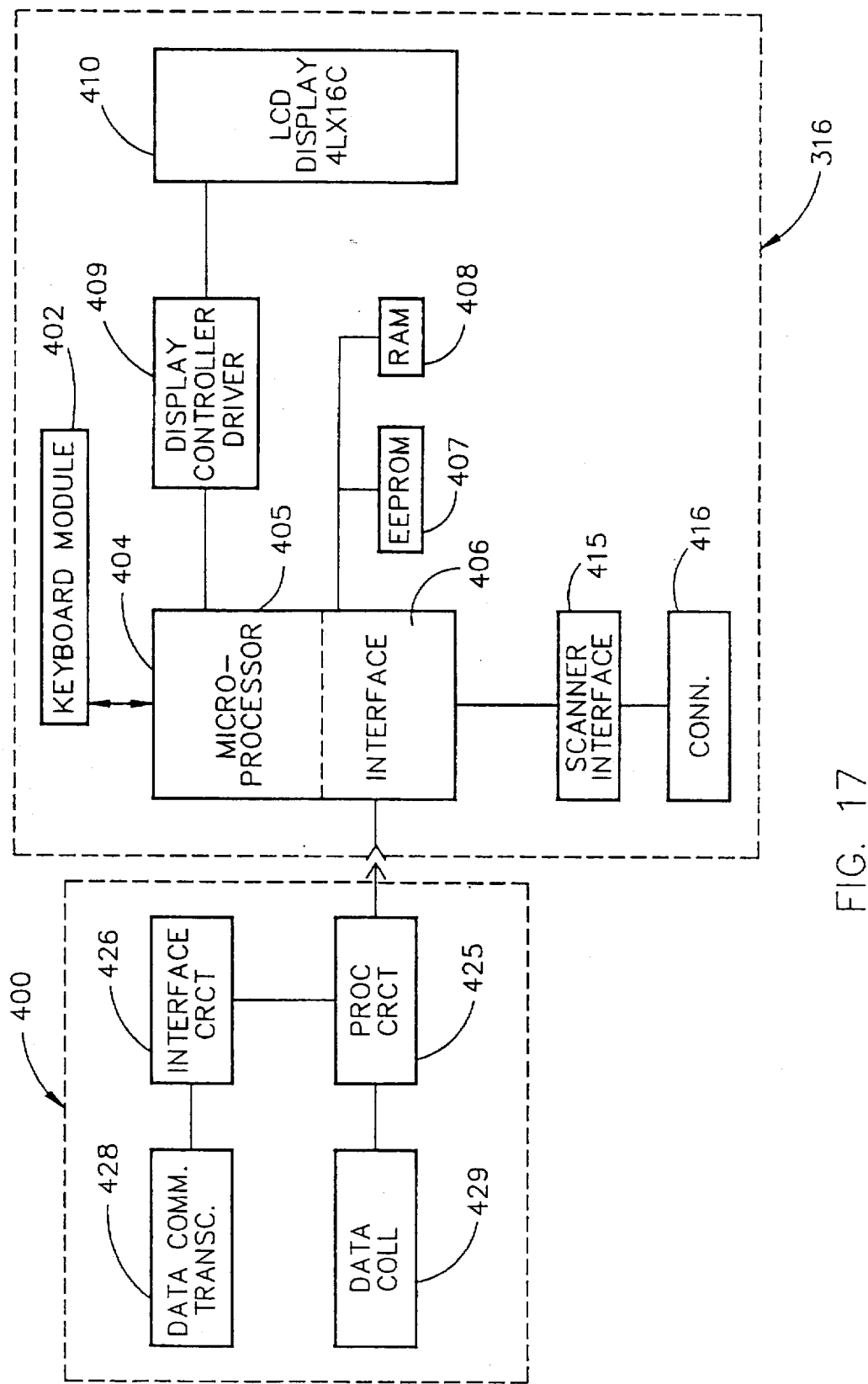
FIG. 17 is a schematic diagram of functional blocks for illustrating contemplated major functional elements of a base module and a respective data and communications module of a data terminal in accordance with the invention.
Figure 18:
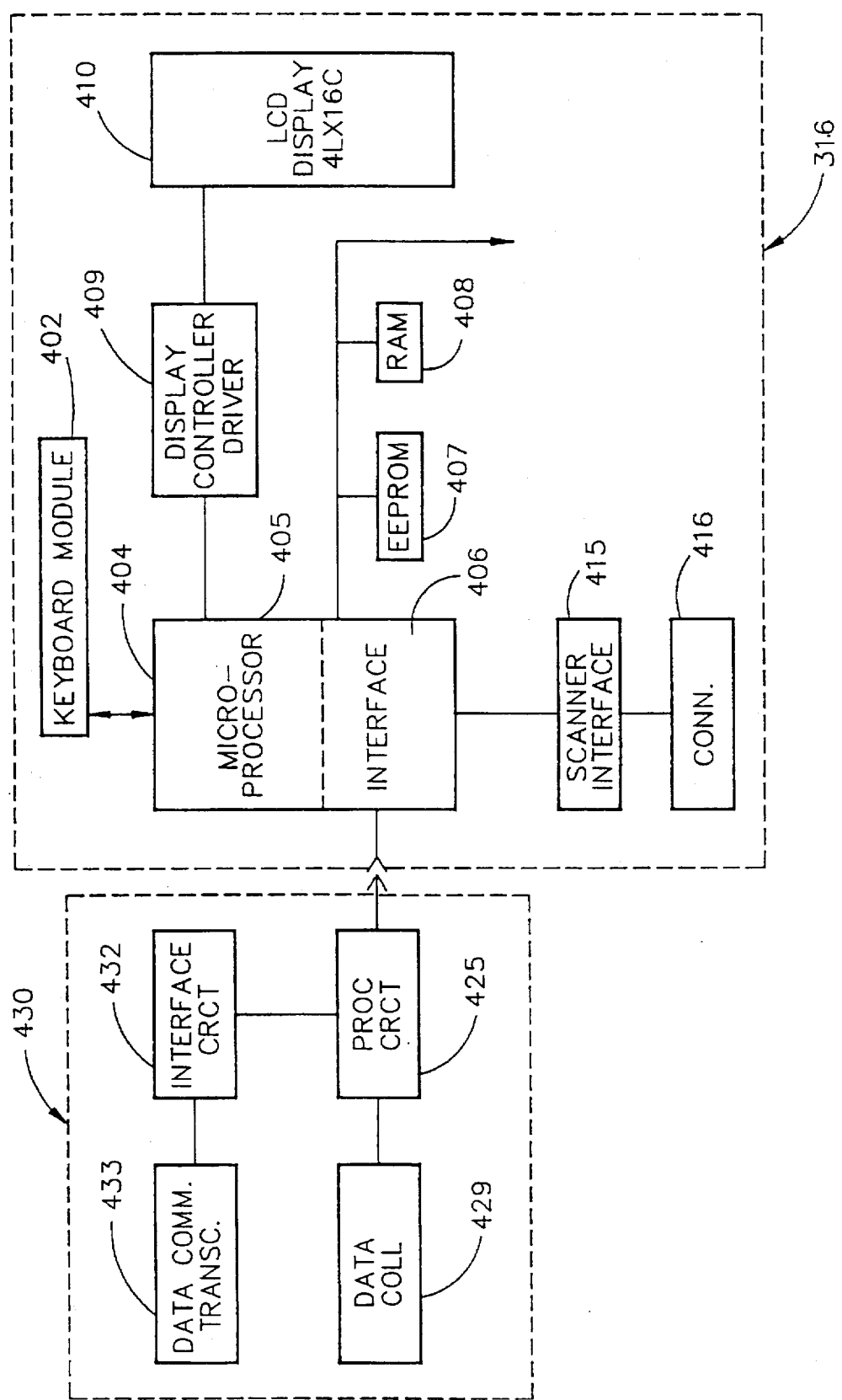
FIG. 18 is a schematic diagram of functional blocks for illustrating the major functional elements shown in FIG. 17 and for illustrating the function of emulating the interface function required by an interface circuit communication between non-compatible communications functions of the communications or data collection functions of the data and communications module and the base module.

FIGS. 17 and 18 illustrate a microprocessor controlled data transfer between the base module 316 and any of a number of data and communication modules which may include various data collection and data communication transceivers including complex radios such as a spread spectrum radio or such as a modem for telephone transmission of data. Though not expressly described, it is understood that the hand-held data terminal 310 as described herein and all of its circuits, Including those of attached modules are powered by a battery or power source which occupies the space of the battery compartment 344 as described herein. FIG. 17 shows a block diagram of functions of the base module 316 and a typical data and communications module designated generally by the numeral 400. The base module is operative in conjunction with a typical radio frequency transceiver provided by the data and communications module 400, for example. The base module 316 includes a typical keyboard module 402 interactively coupled to a microprocessor 404. A preferred microprocessor is a 80C196KC device which is a 16-bit microcontroller 405 with on-chip masked ROM, RAM and built-in timers, ports, analog to digital converters and a serial interface 406. Thus, the microprocessor functions as a microcontroller and as an interface for communicating data and control signals to and from the base module 316. In addition to the on-chip memory capacity, an external ROM 407 and an external RAM may be provided for additional data processing and communication capacity. Display controller and driver circuits 409 may be multi-chip circuits or may be integrated into a single device to drive the described LCD screen 410. A typical scanner interface 415 is coupled to a 9 pin connector 416, such as the referred to D-subminiature connector which may couple a laser scanner or CCD scanner to the base module 316 for data collection.

The data and communication module 400 is of particular interest in that an improved interfacing may be obtained by coupling communication between the data and communication module 400 and the base module 316 through a microprocessor 425, such as, for example, an 80C51 microprocessor circuit. Typical on board ROM allows the microprocessor to be programmed to interact with a number of devices in accordance with the stored program. The microprocessor interacts with an interface circuit 426 which may be an analog or mixed analog and digital interface circuit. The program for interacting with the Interface circuit 426 may also be stored within a ROM of the interface circuit 426. The interface circuit 426 is coupled to a transceiver module 428. The microprocessor 425 may also be coupled directly to a data collection interface 429 to receive data from a scanner for reading any number of different bar codes or for providing input data from other external sources. The operation of the microprocessor 425 for coupling data to the base module 316 allows various input patterns to be processed by any of specific operational protocols controlled by the microprocessor 425, such that the data Input from the data collection circuit 429 can be made the same from any of a number of devices. Also, with respect to the operation of the transceiver, in that the program for operating the microprocessor 425 may include particular address codes for data retrieval and data communication via the transceiver, the data sent via a data and control bus between the microprocessors 425 and 404 can emulate a uniform data transfer protocol to the base module 316. The simplification resulting from the microprocessor 425 increases the number of communications devices that may be represented by the data communication transceiver circuit or module 428.

Referring now to FIG. 18, the base module 316 is shown as being coupled to a different data and communications module designated generally by the numeral 430 in which the interface circuit 426 shown in FIG. 16 has been replaced with an interface circuit 432 and the transceiver 433 coupled to the interface circuit 432. The transceiver 433 may, for example, be a complex radio, such as a spread spectrum radio In lieu of an FM transceiver, such as may have been represented by the block identified at 429 in FIG. 17. However, the program function represented by the Interface circuit 432 and interacting with the microprocessor permits the interactive control and data stream between the base module 316 and the data and communication module 430 to be emulated to appear to the base module 316 as being the same as the simple FM transceiver module.

Preferred RF Data Terminal-Scanner Configuration

The RF data terminal 118 as shown in FIGS. 7, 8, and 10 generally may provide the features disclosed in U.S. Pat. No. 4,910,794 issued Mar. 20, 1990 and European Published Patent Application EP/0353759/A2 dated Feb. 7, 1990, and described in International application Ser. No. PCT/US90/03282 published Dec. 27, 1990 as International Publication No. WO90/16033. The terminal will run application programs downloaded to it, or permanently stored in it, or combinations of both.

When the radio module 118, FIG. 7, is added to the terminal 11, communication Is expanded from direct-wired telecommunication hookups to include real time on-line communication with a host (e.g. a shared data base, applications, etc.). Where the peripheral control card of FIG. 9 is used for the terminal, the radio module itself in the preferred embodiment contains not only the transmitter, receiver, associated level adjusts and the scanner connector 119 direct wired back to the control microprocessor of terminal 11, but also the components as illustrated in FIG. 10.

The scanner module 313 is treated as an add-on peripheral to terminal 311, governed by the control microprocessor 212, as indicated in FIG. 9.

The terminal 11 may be fitted into a handle such as is disclosed in PCT/US90/03282 and such handle may contain additional batteries for extended operation and to lower the center of gravity of the device. An option would be to remove the batteries of the terminal to further lower the center of gravity of the device.

The antenna 341 is offset laterally from its connector (FIG. 16) to avoid scanner/antenna electromagnetic interference issues, and may be formed with a right angle bend as shown in FIG. 16. The length of the antenna may be adjusted to various desired angular positions besides the horizontal disposition shown in FIG. 16. For example, antenna element may be disposed vertically (as the data terminal is viewed in FIG. 16).

The terminal control microprocessor FIG. 9, controls the supply of battery power to the RF module.

The signal levels transmitted at the interface between the low pass filters 222, 226, of the terminal peripheral board 26, FIG. 9, and the transmit and receive level adjusts 204, 208, of the RF module, e.g., if used for an RF module, may be standardized to allow terminals and modules to be assembled independently, and then mated in final production, and interchanged in the field, without re-tuning in either case.

The base-band processing circuitry could be located in the RF module as in FIG. 9, and in this case digital signals would be transmitted at the interface between the terminal and the scanner module.

The reference to the particular microprocessor circuits should not be considered limiting to the scope of the Invention. The combination of two microprocessor interacting with each other, each controlling the environment of a respective one of two sub-modules such as the base module and the data and communication module permits an increased number of different components and functions within the data system. Likewise, it should also be noted that user interface means could include a voice activated user interface, retina activated user interface, or the like.

It will be apparent that features of the various embodiments illustrated or described or incorporated herein may be combined, and that various of the features may be utilized independently of others, and that many further changes, modifications and variations may be effected without departing from the scope of the teachings and concepts of the present disclosure.

We claim:

1. In a data capture system, a communication module comprising:

(a) a housing;

(b) a mount to detachably attach the communication module to a hand-held data terminal;

(c) an electrical connector to electrically couple the communication module to a hand held data terminal;

(d) a radio frequency transceiver housed within said housing; and (e) a reader module connector to connect a reader module to the communication module.

2. A data capture system according to claim 1, further comprising an antenna.

3. A data capture system according to claim 1, further comprising an antenna located externally of said housing.

4. A data capture system according to claim 1, wherein the communication module, when attached to a portable device, is capable of real-time, on-line communication with an externally located host computer.

5. A communication module for a data capture system, the module comprising:

(a) a housing;

(b) a connector assembly that detachably attaches the communication module to a hand held data terminal;

(c) a radio frequency transceiver located within the housing; and (d) an indicia reader connector.

6. A data capture system according to claim 5, further comprising an antenna.

7. A data capture system according to claim 5, further comprising an antenna located externally of said housing.

8. A data capture system according to claim 5, wherein the communication module, when attached to a portable device, is capable of real-time, on-line communication with an externally located host computer.

* * * * *